(12) United States Patent
Ishihara

(10) Patent No.: US 6,940,535 B2
(45) Date of Patent: Sep. 6, 2005

(54) MULTI-BEAM OPTICAL SCANNING DEVICE, AND IMAGE FORMING APPARATUS AND COLOR IMAGE FORMING APPARATUS USING THE SAME

(75) Inventor: Keiichiro Ishihara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 111 days.

(21) Appl. No.: 10/366,478

(22) Filed: Feb. 14, 2003

(65) Prior Publication Data

US 2003/0156183 A1 Aug. 21, 2003

(30) Foreign Application Priority Data

Feb. 20, 2002 (JP) .................................. 2002-043163

(51) Int. Cl.⁷ ............................................. B41J 2/447
(52) U.S. Cl. ..................................................... 347/235
(58) Field of Search ................................. 347/233, 235, 347/238, 241, 243, 244, 250, 256, 258–261

(56) References Cited

U.S. PATENT DOCUMENTS

| 5,463,418 A | 10/1995 | Tateoka | 347/244 |
| 6,104,523 A * | 8/2000 | Ang | 359/216 |
| 6,489,982 B2 | 12/2002 | Ishibe | 347/134 |
| 2003/0133175 A1 * | 7/2003 | Suzuki et al. | 359/204 |

FOREIGN PATENT DOCUMENTS

| EP | 1 085 743 | 3/2001 |
| EP | 1 094 351 | 4/2001 |
| EP | 1 109 048 | 6/2001 |
| EP | 1 113 305 | 7/2001 |
| JP | 4-181289 | * 6/1992 ........... G02B/26/10 |
| JP | 5-34613 | 2/1993 |
| JP | 11-249040 | 9/1999 |
| JP | 2000-292721 | 10/2000 |
| JP | 2001-228422 | 8/2001 |

* cited by examiner

Primary Examiner—Huan Tran
(74) Attorney, Agent, or Firm—Fitzpatrick, Cella, Harper & Scinto

(57) ABSTRACT

A multi-beams optical scanning device is constituted such that a width in a main scanning direction of each of a plurality of light beams emitted from a light source unit is wider than a moving area in the main scanning direction in which a deflection facet of a deflection unit can move and exist when the plurality of light beams emitted from the light source unit are deflected toward an entire effective scanning area on the surface to be scanned and are deflected toward the synchronous detection means provided outside the effective scanning area.

29 Claims, 19 Drawing Sheets

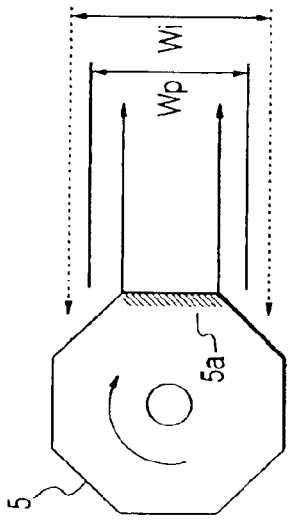
FIG. 3(c) DEFLECTION TOWARD IMAGE CENTER
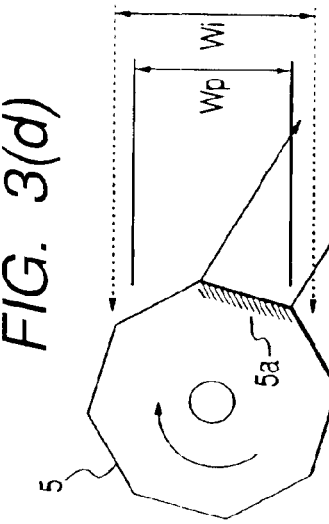
FIG. 3(d) DEFLECTION TOWARD SCANNING END PORTION
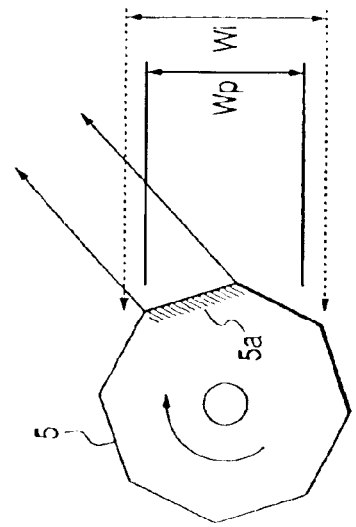
FIG. 3(a) DEFLECTION TOWARD SYNCHRONOUS DETECTION MEANS
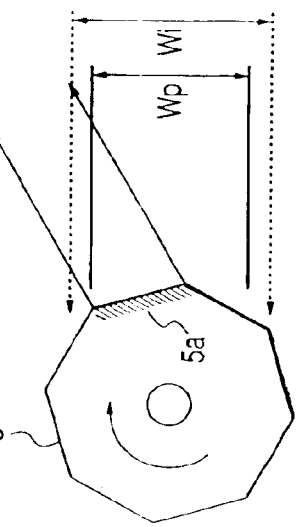
FIG. 3(b) DEFLECTION TOWARD SCANNING START PORTION

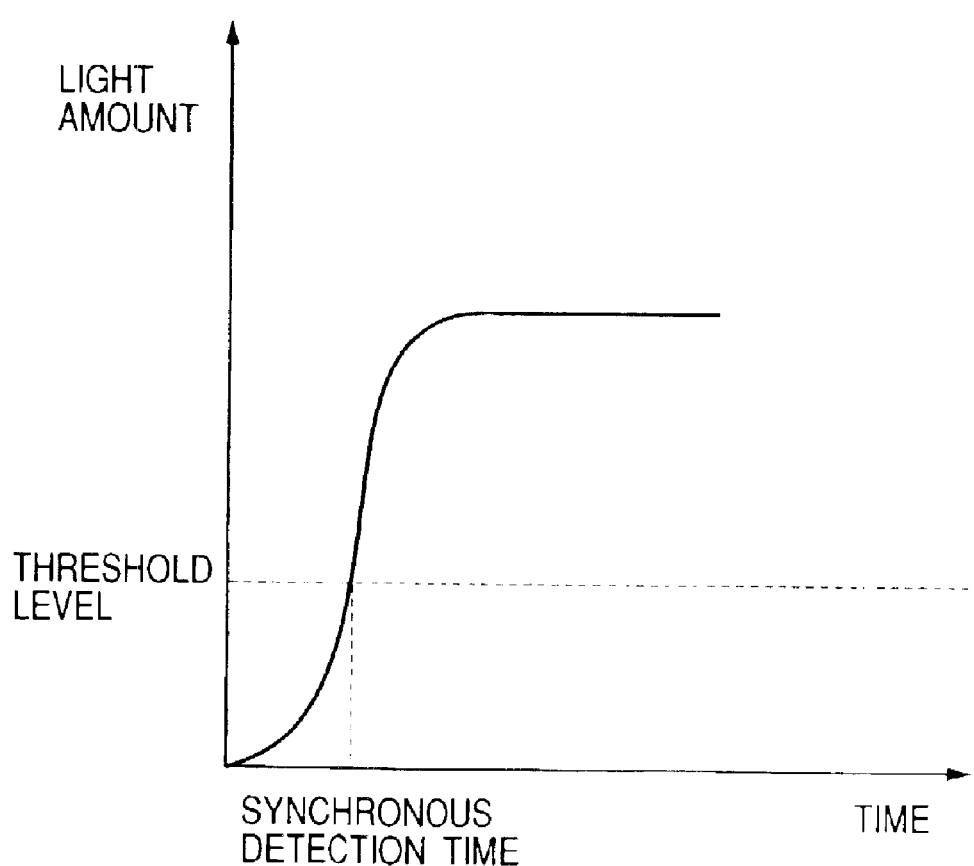

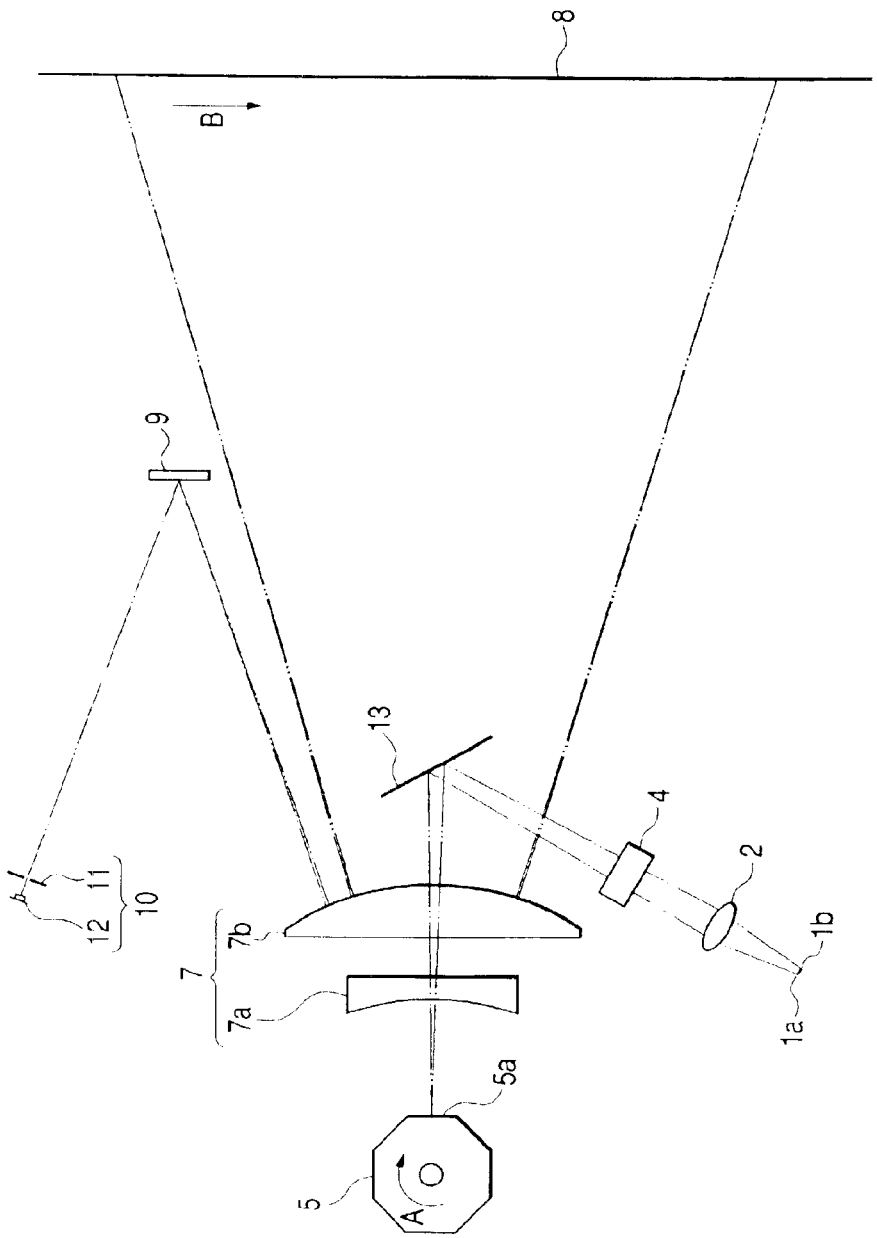

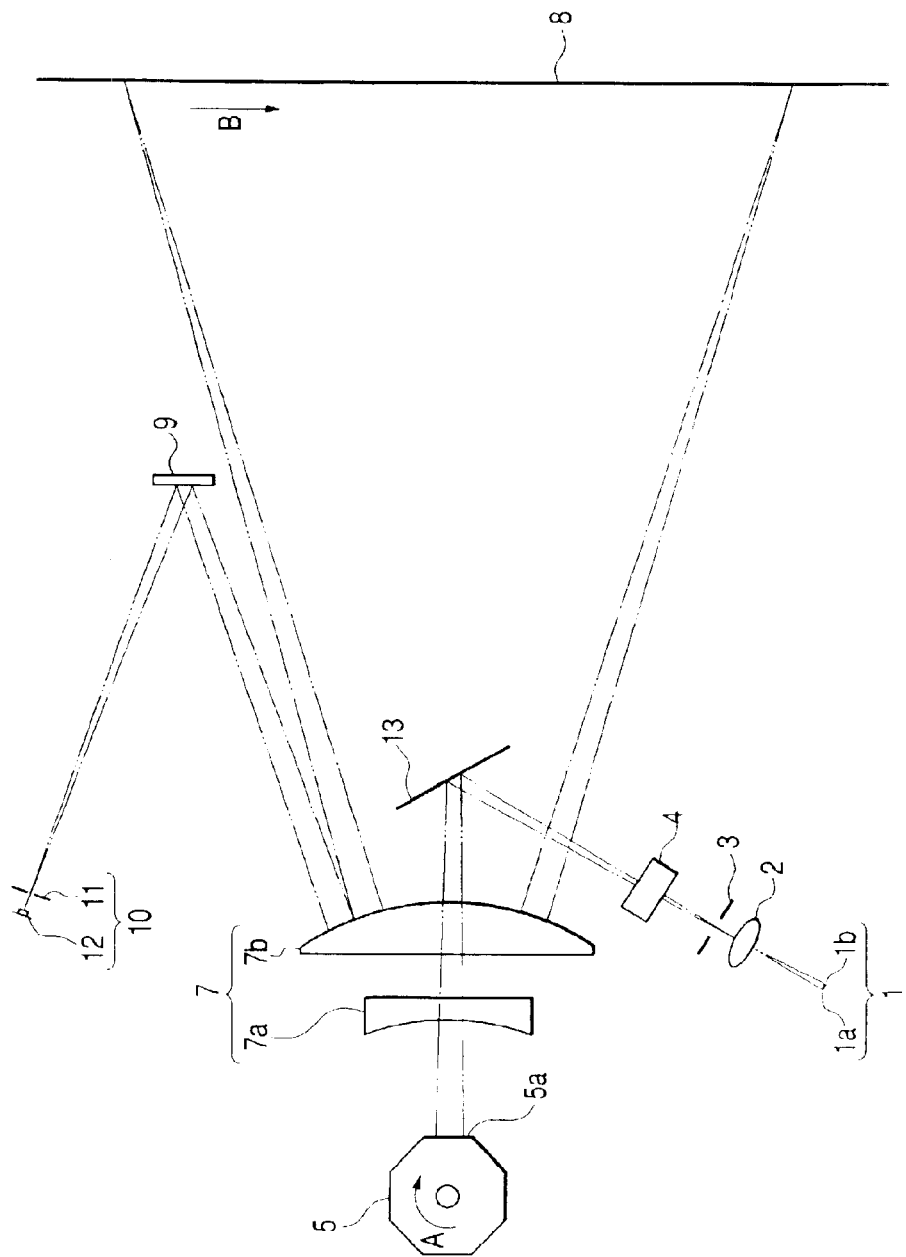

FIG. 18

CALCULATION TABLE FOR $\cos(Q/2) - \sin(Q/2) \times \tan\theta$

Q: ANGLE DEFINED BETWEEN OPTICAL AXIS OF INCIDENT OPTICAL SYSTEM AND SCANNING OPTICAL SYSTEM (INCIDENT ANGLE IN MAIN SCANNING DIRECTION)

| θ \ Q (deg) | (rad) | 0 | 10 | 20 | 30 | 40 | 50 | 60 | 70 | 80 | 90 |
|---|---|---|---|---|---|---|---|---|---|---|---|
| | | 0.000 | 0.175 | 0.349 | 0.524 | 0.698 | 0.873 | 1.047 | 1.222 | 1.396 | 1.571 |
| −60 | −1.047 | 1.000 | 1.147 | 1.286 | 1.414 | 1.532 | 1.638 | 1.732 | 1.813 | 1.879 | 1.932 |
| −55 | −0.960 | 1.000 | 1.121 | 1.233 | 1.336 | 1.428 | 1.510 | 1.580 | 1.638 | 1.684 | 1.717 |
| −50 | −0.873 | 1.000 | 1.100 | 1.192 | 1.274 | 1.347 | 1.410 | 1.462 | 1.503 | 1.532 | 1.550 |
| −45 | −0.785 | 1.000 | 1.083 | 1.158 | 1.225 | 1.282 | 1.329 | 1.366 | 1.393 | 1.409 | 1.414 |
| −40 | −0.698 | 1.000 | 1.069 | 1.131 | 1.183 | 1.227 | 1.261 | 1.286 | 1.300 | 1.305 | 1.300 |
| −35 | −0.611 | 1.000 | 1.057 | 1.106 | 1.147 | 1.179 | 1.202 | 1.216 | 1.221 | 1.216 | 1.202 |
| −30 | −0.524 | 1.000 | 1.047 | 1.085 | 1.115 | 1.137 | 1.150 | 1.155 | 1.150 | 1.137 | 1.115 |
| −25 | −0.436 | 1.000 | 1.037 | 1.066 | 1.087 | 1.099 | 1.103 | 1.099 | 1.087 | 1.066 | 1.037 |
| −20 | −0.349 | 1.000 | 1.028 | 1.048 | 1.060 | 1.064 | 1.060 | 1.048 | 1.028 | 1.000 | 0.964 |
| −15 | −0.262 | 1.000 | 1.020 | 1.031 | 1.035 | 1.031 | 1.020 | 1.000 | 0.973 | 0.938 | 0.897 |
| −10 | −0.175 | 1.000 | 1.012 | 1.015 | 1.012 | 1.000 | 0.981 | 0.954 | 0.920 | 0.879 | 0.832 |
| −5 | −0.087 | 1.000 | 1.004 | 1.000 | 0.989 | 0.970 | 0.943 | 0.910 | 0.869 | 0.822 | 0.769 |
| 0 | 0.000 | 1.000 | 0.996 | 0.985 | 0.966 | 0.940 | 0.906 | 0.866 | 0.819 | 0.766 | 0.707 |
| 5 | 0.087 | 1.000 | 0.989 | 0.970 | 0.943 | 0.910 | 0.869 | 0.822 | 0.769 | 0.710 | 0.645 |
| 10 | 0.175 | 1.000 | 0.981 | 0.954 | 0.920 | 0.879 | 0.832 | 0.778 | 0.718 | 0.653 | 0.582 |
| 15 | 0.262 | 1.000 | 0.973 | 0.938 | 0.897 | 0.848 | 0.793 | 0.732 | 0.665 | 0.594 | 0.518 |
| 20 | 0.349 | 1.000 | 0.964 | 0.922 | 0.872 | 0.815 | 0.752 | 0.684 | 0.610 | 0.532 | 0.450 |
| 25 | 0.436 | 1.000 | 0.956 | 0.904 | 0.845 | 0.780 | 0.709 | 0.633 | 0.552 | 0.466 | 0.377 |
| 30 | 0.524 | 1.000 | 0.946 | 0.885 | 0.816 | 0.742 | 0.662 | 0.577 | 0.488 | 0.395 | 0.299 |
| 35 | 0.611 | 1.000 | 0.935 | 0.863 | 0.785 | 0.700 | 0.610 | 0.516 | 0.418 | 0.316 | 0.212 |
| 40 | 0.698 | 1.000 | 0.923 | 0.839 | 0.749 | 0.653 | 0.552 | 0.446 | 0.338 | 0.227 | 0.114 |
| 45 | 0.785 | 1.000 | 0.909 | 0.811 | 0.707 | 0.598 | 0.484 | 0.366 | 0.246 | 0.123 | 0.000 |
| 50 | 0.873 | 1.000 | 0.892 | 0.778 | 0.657 | 0.532 | 0.403 | 0.270 | 0.136 | 0.000 | −0.136 |
| 55 | 0.960 | 1.000 | 0.872 | 0.737 | 0.596 | 0.451 | 0.303 | 0.152 | 0.000 | −0.152 | −0.303 |
| 60 | 1.047 | 1.000 | 0.845 | 0.684 | 0.518 | 0.347 | 0.174 | 0.000 | −0.174 | −0.347 | −0.518 |
| AVERAGE VALUE | | 1.000 | 0.996 | 0.985 | 0.966 | 0.940 | 0.906 | 0.866 | 0.819 | 0.766 | 0.707 |

FIELD ANGLE θ

FIG. 19
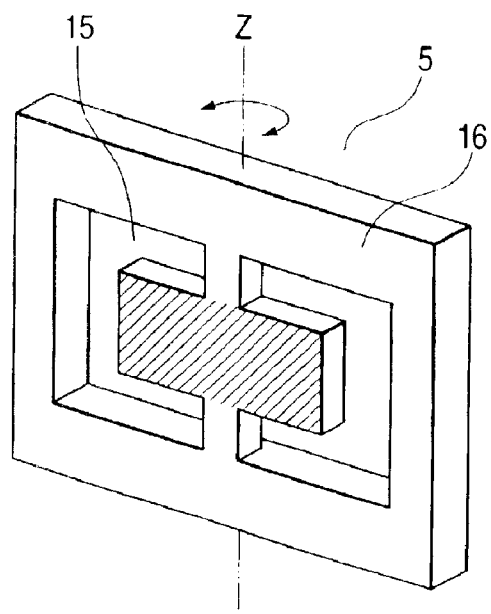
FIG. 20A
FIG. 20B
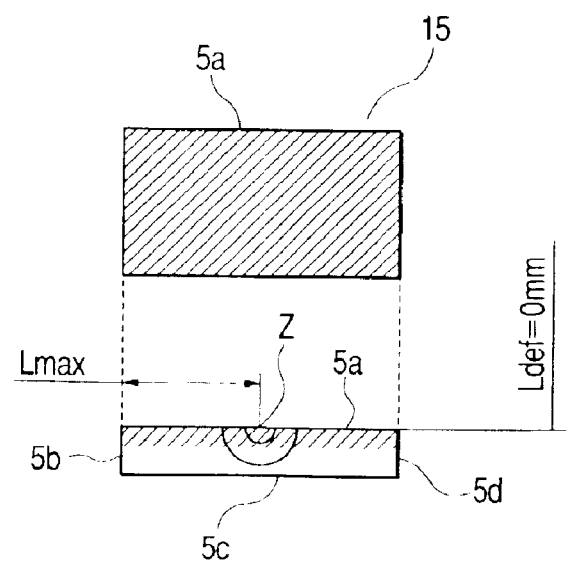

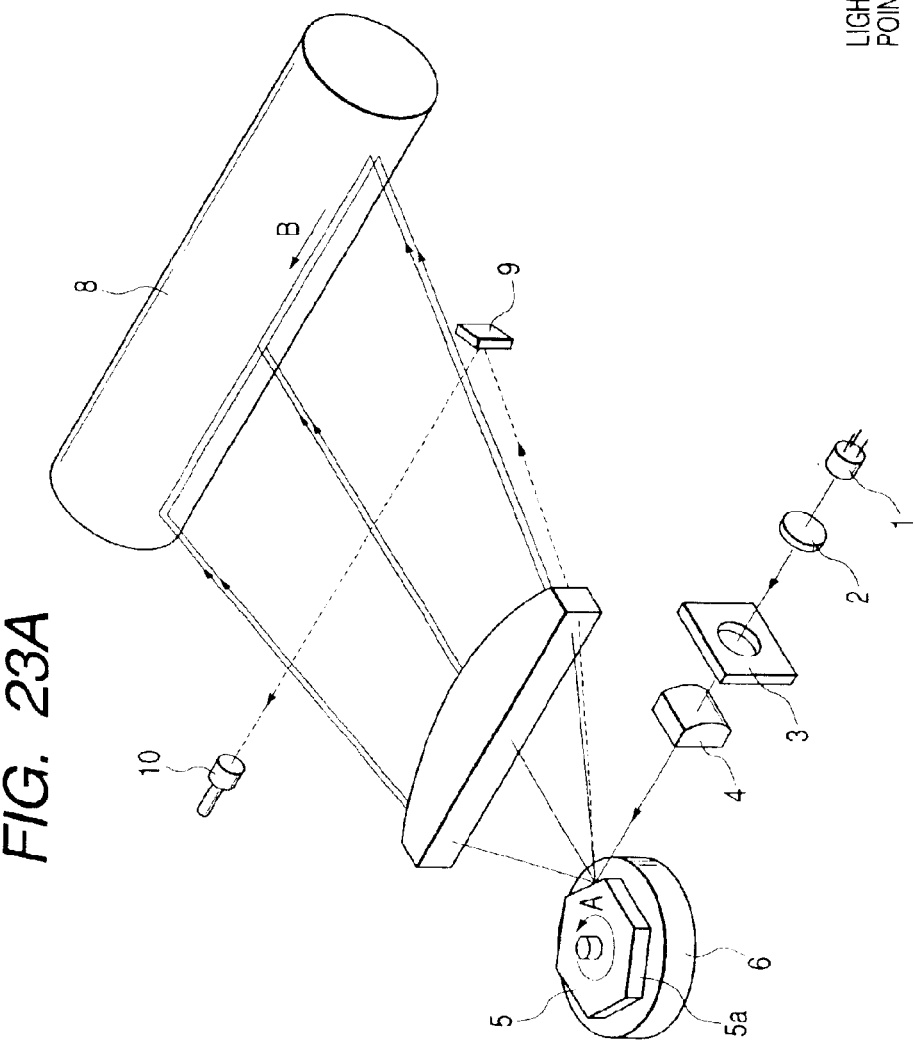
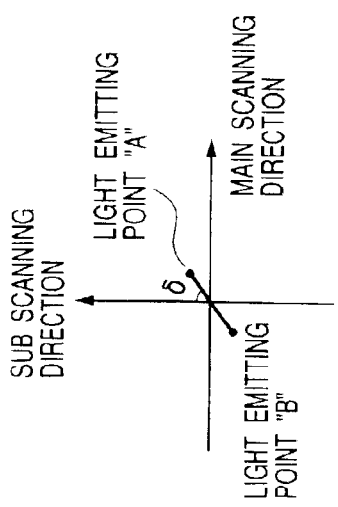
FIG. 23A
FIG. 23B

MULTI-BEAM OPTICAL SCANNING DEVICE, AND IMAGE FORMING APPARATUS AND COLOR IMAGE FORMING APPARATUS USING THE SAME

BACKGROUND OF THE INVENTION

1. Field of the Invention

The present invention relates to an optical scanning device and an image forming apparatus using the same, and particularly to an optical scanning device suitable for use in an apparatus such as a laser beam printer or a digital copying machine with an electrophotographic process, which is adapted to reflect and deflect a light beam emitted from light source means with deflection means and optically scans the light beam over a surface to be scanned via a scanning optical system to record image information. More particularly, the present invention relates to a multi-beam scanning apparatus for performing optical scanning using a plurality of light beams simultaneously to thereby realize high speed and high definition, in which satisfactory images with reduced jitter or pitch interval errors can be always obtained, and to an image forming apparatus using the same.

2. Related Background Art

FIGS. 23A and 23B show a perspective view of a conventional multi-beam optical scanning device and a main part schematic view illustrating a light source arrangement of the same, respectively.

A plurality of light beams emitted from light source means 1 are converted into substantially parallel light beams by a condensing lens system 2 to have a light beam width thereof restricted by an aperture stop 3, whereby focal lines longitudinal in a main scanning direction are focused in the vicinity of a deflection facet 5a of deflection means 5 discussed later by a cylindrical lens 4. Reference numeral 5 denotes a polygon mirror serving as deflection means, which is rotated at a constant speed in a direction of arrow A in the figure by drive means 6 for a motor. Reference numeral 7 denotes a scanning optical system having the fθ characteristic, which focuses light beams deflected by the deflection means 5 on a photosensitive drum surface 8 serving as a surface to be scanned and, at the same time, corrects surface toppling of the deflection facet 5a of the deflection means 5.

At this point, two light beams reflected and deflected by the deflection facet 5a of the deflection means 5 are guided onto the photosensitive drum surface 8 via the scanning optical system 7 and optically scan the photosensitive drum surface 8 in a direction of arrow B simultaneously as the polygon mirror 5 is rotated in the direction of arrow A. Accordingly, two scanning lines are formed on the photosensitive drum surface 8 to perform image recording.

In addition, a part of the plurality of light beams deflected by the deflection facet 5a of the deflection means 5 pass through the scanning optical system 7 and are returned by a mirror for synchronous detection 9 to be guided to synchronous detection means 10. Consequently, scanning starting positions of the respective light beams, which are deflected by the deflection means 5, on the surface to be scanned 8 are aligned, whereby satisfactory image recording is performed without misalignment of printing positions in a main scanning direction among scanning lines formed by the plurality of light beams.

As a general optical scanning device, the device employs an optical scanning system called an underfilled system in which a light beam that has a width narrower than that of the deflection facet 5a of the polygon mirror 5 in a main scanning section is made incident upon the deflection facet 5a, thereby optically scanning the light beam over the surface to be scanned 8.

In order to perform highly accurate recording of image information in the multi-beam optical scanning device of this type, it is important that a plurality of light beams focus on the surface to be scanned 8 together and uniformity of jitter (relative misalignment of printing positions of the plurality of light beams in the main scanning direction) and pitch interval (scanning line interval) is satisfactorily corrected over an entire effective area for scanning on the surface to be scanned 8.

In general, when a light beam optically scans the surface to be scanned 8 to form an image, it is necessary to reduce a spot diameter of the light beam on the surface to be scanned 8 and form pitch intervals densely in a sub-scanning direction in order to obtain a high resolution and satisfactory image.

In order to form pitch intervals densely in a sub scanning direction, the light source means 1, in which a semiconductor laser array is arranged to be tilted in an oblique direction with respect to the main scanning direction, is used in many cases.

In this case, since a plurality of light emitting points included in the light source means 1 are arranged in the main scanning direction so as to be spaced at a certain distance apart from each other (FIG. 23B), the respective light beams do not become parallel with each other after exiting the condensing lens system 2 but have a certain angle therebetween. The respective light beams are incident upon the polygon mirror 5 serving as deflection means via the cylindrical lens 4 after exiting the condensing lens system 2. At this point, the respective light beams cross at the position of the aperture stop 3 arranged between the condensing lens system 2 and the polygon mirror 5. An interval among the respective light beams on the deflection facet 5a of the polygon mirror 5 depends upon the angle defined between the respective light beams and a distance from a reference position of the deflection facet 5a of the polygon mirror 5 to the aperture stop 3. It is necessary to constitute the multi-beam optical scanning device such that the respective light beams satisfactorily focus on the surface to be scanned 8 by reducing the interval among the respective light beams on the deflection facet 5a of the polygon mirror 5.

Multi-beam optical scanning devices satisfying such optical characteristics have been conventionally proposed.

JP 5-34613 A discloses a multi-beam optical scanning device in which an aperture stop is arranged between a cylindrical lens and deflection means to reduce an interval among respective light beams in a main scanning direction on a reflection facet of the deflection means. In this example, a plurality of light beams are guided onto a surface to be scanned by a scanning optical system after being made incident on the deflection means via the aperture stop as parallel light beams by a condensing lens system, and optically scan the surface to be scanned simultaneously. In performing the optical scanning, a relationship among the number of light emitting points in a sub-scanning direction of light source means, a pitch of the light emitting points, a distance from the deflection means to the aperture stop, and a focal length of the condensing lens system are specified to cause the plurality of light beams to satisfactorily focus on the surface to be scanned and reduce curvature of field.

In addition, JP 2001-228422 A discloses a multi-beam optical scanning device in which a relationship among an interval among the light emitting points of light source means, a focal length of a collimator lens, a distance from an aperture stop to a deflection facet of deflection means, a focal length of a scanning optical system, and the number of pixels per one inch in a main scanning direction on a surface to be scanned is appropriately set, whereby jitter is reduced.

However, since there is a limitation on the arrangement of the aperture stop, there is a problem in that a degree of freedom of an arrangement of optical elements is narrowed.

JP 2000-292721 A discloses an example of an overfilled optical system which uses a light source having two light emitting points arranged so as to be spaced apart from each other in a main scanning direction. In this invention, a light beam magnification optical system is provided between light source means and deflection means, thereby securing a necessary amount of light of deflected light beams which scan a surface to be scanned. Therefore, there is neither a description concerning jitter and a pitch interval error nor a description concerning synchronous detection means provided herein. Thus, this invention does not satisfy the structural requirements for reducing jitter.

In addition, JP 11-249040 A discloses an example of an overfilled optical system in which two light emitting points are arranged at an interval of 14 $\mu$m in a sub-scanning direction. With the structure of this invention, a lateral magnification in a sub-scanning direction of all optical systems as a whole, which are provided between light source means and a surface to be scanned, is determined uniquely in accordance with an interval among scanning lines. Thus, there is no degree of freedom of design. In addition, since it is necessary to set a sub-scanning magnification of a scanning optical system to a relatively small value and thus an imaging element having a power mainly in the sub-scanning direction is arranged near a surface to be scanned, there are a problems in that the multi-beam optical scanning device is enlarged in size and costs required for manufacturing the multi-beam optical scanning device are increased.

It is necessary to solve the above-mentioned problems and satisfactorily correct jitter and a pitch interval error. Jitter means relative misalignment of printing positions of a plurality of light beams in a main scanning direction. A pitch interval error means deviation of an interval among scanning lines, which are formed when a plurality of light beams scan a surface to be scanned simultaneously, from a specified values (e.g., if a pixel density is 600 dpi, a scanning line pitch is 42.3 $\mu$m).

Jitter which is characteristic of a multi-beam optical scanning device includes drum oblique-incidence jitter, wavelength difference jitter, defocus jitter, and the like, which have different causes. The cause of the drum oblique-incidence jitter is a difference in an optical path length for each of a plurality of light beams, which occurs because the plurality of light beams are made incident on a cylindrical drum surface while forming certain angles with respect to a sub scanning direction. This jitter increases toward a peripheral part of an effective area for scanning from an optical axis of a scanning optical system. The cause of the wavelength difference jitter is a chromatic aberration of magnification due to occurrence of a wavelength difference among a plurality of light beams. With this jitter, misalignment of printing positions due to the chromatic aberration of magnification within an effective area for scanning and misalignment of scanning starting positions due to the chromatic aberration of magnification on synchronous detection means occur simultaneously. The defocus jitter is jitter due to a difference in focus positions in a main scanning direction on a surface to be scanned and on synchronous detection means.

The cause of this defocus jitter is that a plurality of light beams reach positions spaced apart from each other in a main scanning direction on the scanning optical system when the plurality of light beams scan an identical position on the surface to be scanned. Thus, in a multi-beam optical scanning device in which a plurality of light emitting points of light source means are arranged in parallel with each other in a sub-scanning direction without being spaced apart from each other in a main scanning direction as in FIG. 21B, since a plurality of light beams pass through an identical optical path in the main scanning direction, the defocus jitter does not occur.

However, since an interval among light emitting points is fixed in a monolithic multi-beam light source means, in the case of the multi-beam optical scanning device in which a plurality of light emitting points are arranged in parallel with each other in the sub-scanning direction, a lateral magnification in the sub-scanning direction of all the optical systems provided between the light source means and the surface to be scanned is determined uniquely in order to set an interval among scanning lines to a specified value. There is a problem in that this makes a degree of freedom of design extremely low. Usually, an interval among light emitting points is 90 $\mu$m or 14 $\mu$m. In the case in which the plurality of light emitting points are arranged to be parallel with each other in the sub-scanning direction, it is necessary to set the lateral magnification in the sub scanning direction of all the optical systems to a relatively small value of 0.47 or 3.02 in order to set the interval among scanning lines to 42.3 $\mu$m which is equivalent to 600 dpi. In order to set the sub-scanning magnification of all the optical systems to a small value, a long optical element having a power in the sub-scanning direction is required to be provided in the scanning optical system in the vicinity of the surface to be scanned. There is a problem in that this makes enlargement of the multi-beam optical scanning device inevitable.

In addition, since the long optical element is expensive, costs for manufacturing the multi-beam optical scanning device are increased.

SUMMARY OF THE INVENTION

The present invention has been devised in view of the above and other drawbacks, and it is an object of the present invention to provide a multi-beam optical scanning device in which defocus jitter does not occur when a plurality of light beams scan a surface to be scanned simultaneously, and a degree of freedom in setting a lateral magnification in a sub-scanning direction of all optical systems as a whole and a degree of freedom in arranging optical elements are increased.

In order to solve the above-mentioned problems, according to a first aspect of the present invention, a multi-beam optical scanning device includes:

light source means having a plurality of light emitting points spaced apart at least in a main scanning direction;

deflection means for deflecting a plurality of light beams emitted from the light source means;

a scanning optical system for focusing the plurality of light beams deflected by the deflection means on a surface to be scanned; and synchronous detection means for detecting timing at which the plurality of light beams start scanning in an effective scanning area on the surface to be scanned, in which a width in the main scanning direction of each of the plurality of light beams emitted from the light source means is wider than a moving area in the main scanning direction in which a deflection facet of the deflection means can move and exist when the plurality of light beams emitted from the light source means are deflected toward the entire effective scanning area on the surface to be scanned and are deflected toward the synchronous detection means provided outside the effective scanning area.

According to a second aspect of the invention, a multi-beam optical scanning device includes:

light source means having a plurality of light emitting points spaced apart at least in a main scanning direction;

deflection means for deflecting a plurality of light beams emitted from the light source means; and a scanning optical system for focusing the plurality of light beams deflected by the deflection means on a surface to be scanned, in which:

a width in the main scanning direction of each of the plurality of light beams emitted from the light source means is wider than a width in the main scanning direction of a deflection facet of the deflection means; and when an angle defined in the main scanning direction by principal rays of the plurality of light beams emitted from the light source means when the plurality of light beams are incident on the deflection means is assumed to be $\alpha$ (rad), a distance from the deflection facet of the deflection means to a rotation center of the deflection means is assumed to be Ldef (mm), a focal length in the main scanning direction of the scanning optical system is assumed to be fk (mm), an angle defined in the main scanning direction between an optical axis of an incident optical system and an optical axis of the scanning optical system is assumed to be Q (rad), and a field angle defined between the principal ray of light beam deflected by the deflection facet and the optical axis of the scanning optical system is assumed to be $\theta$ (rad), a condition of the following expression is satisfied:

$$\{(\alpha \times Ldef)/(2 \times fk)\} \times \{\cos(Q/2) - \sin(Q/2) \times \tan \theta\} \leq 0.014.$$

According to a third aspect of the invention, a multi-beam optical scanning device includes:

light source means having a plurality of light emitting points spaced apart at least in a main scanning direction;

deflection means for deflecting a plurality of light beams emitted from the light source means; and a scanning optical system for focusing the plurality of light beams deflected by the deflection means on a surface to be scanned, in which:

a width in the main scanning direction of each of the plurality of light beams emitted from the light source means is wider than a width in the main scanning direction of a deflection facet of the deflection means; and when an angle defined in the main scanning direction by principal rays of the plurality of light beams emitted from the light source means when the plurality of light beams are incident on the deflection means is assumed to be $\alpha$ (rad), a distance from the deflection facet of the deflection means to a rotation center of the deflection means is assumed to be Ldef (mm), and a focal length in the main scanning direction of the scanning optical system is assumed to be fk (mm), a condition of the following expression is satisfied:

$$(\alpha \times Ldef)/(2 \times fk)\} \leq 0.014.$$

(Actions)

The multi-beam optical scanning device is constituted such that a width of a main scanning direction of each of a plurality of light beams emitted from the light source means of the present invention is wider than a moving area in the main scanning direction in which the deflection facet of the deflection means can move and exist when the plurality of light beams emitted from the light source means are deflected toward the entire effective scanning area on the surface to be scanned and are deflected toward the synchronous detection means provided outside the effective scanning area. Then, when the plurality of light beams deflected by the deflection means pass through the scanning optical system, positions in the main scanning direction where the plurality of light beams reach on the optical surface of the scanning optical system can be made close to each other. Thus, misalignment of printing positions in the main scanning direction, which occurs due to misalignment of focus positions of the scanning optical system, can be reduced.

In the present invention, the optical systems arranged from the light source means to the surface to be scanned are constituted so as to satisfy the condition $\{(\alpha \times Ldef)/(2 \times fk)\} \times \{\cos(Q/2) - \sin(Q/2) \times \tan \theta\} \leq 0.014$ or $(\alpha \times Ldef)/(2 \times fk) \leq 0.014$, whereby misalignment of printing positions in the main scanning direction due to defocus of the scanning optical system can be reduced.

In the present invention, a plurality of light beams are made incident on the deflection means from an oblique direction with respect to the main scanning direction, whereby misalignment of printing positions in the main scanning direction due to defocus of the scanning optical system can be reduced as an average value.

In the present invention, a relationship between an incidence angle and a maximum field angle in the main scanning direction is set to satisfy a condition $\theta max \leq Q/4$, whereby misalignment of printing positions in the main scanning direction due to defocus of the scanning optical system can be reduced as a whole.

In the present invention, the deflection facet is selected so as to satisfy the condition Ldef<Lmax, whereby an interval among a plurality of light beams reaching the scanning optical system can be further reduced.

In the present invention, since a plurality of light beams deflected by the deflection means are guided to the synchronous detection means via an optical system for synchronous detection which is different from the scanning optical system, the multi-beam optical scanning device can be reduced in size and, at the same time, misalignment of printing positions in the main scanning direction which occurs in the case in which a wavelength difference is generated among the plurality of light beams can be reduced.

BRIEF DESCRIPTION OF THE DRAWINGS

FIGS. 3(a) through 3(d) are main part schematic views illustrating states of deflection means in the first embodiment of the present invention, wherein FIG. 3(a) shows a state in which a light beam is deflected toward a synchronous detection means. FIG. 3(b) shows a state in which a light beam is deflected toward a scanning start portion on the photosensitive drum surface serving as a surface to be scanned. FIG. 3(c) shows a state in which a light beam is deflected toward an image center. FIG. 3(d) shows a state in which a light beam is deflected toward a scanning end portion;

FIG. 4 is a graph illustrating characteristics of synchronous detection means in the first embodiment of the present invention;

FIG. 5 is a view illustrating a main beam optical path in the first embodiment of the present invention;

FIG. 6 is a main scanning sectional view illustrating a main beam optical path in a conventional multi-beam optical scanning device;

FIG. 18 is a numerical value table which can be applied to first to fifth embodiments of the present invention;

FIG. 19 is a perspective view of deflection means in a fourth embodiment of the present invention;

FIGS. 20A and 20B are sectional views of a deflection element in the fourth embodiment of the present invention;

FIG. 23A is a perspective view of a conventional multi-beam optical scanning device; and FIG. 23B is a main part schematic view illustrating a light source arrangement of the conventional multi-beam optical scanning device.

DESCRIPTION OF THE PREFERRED EMBODIMENTS (First Embodiment)

Figure 1:
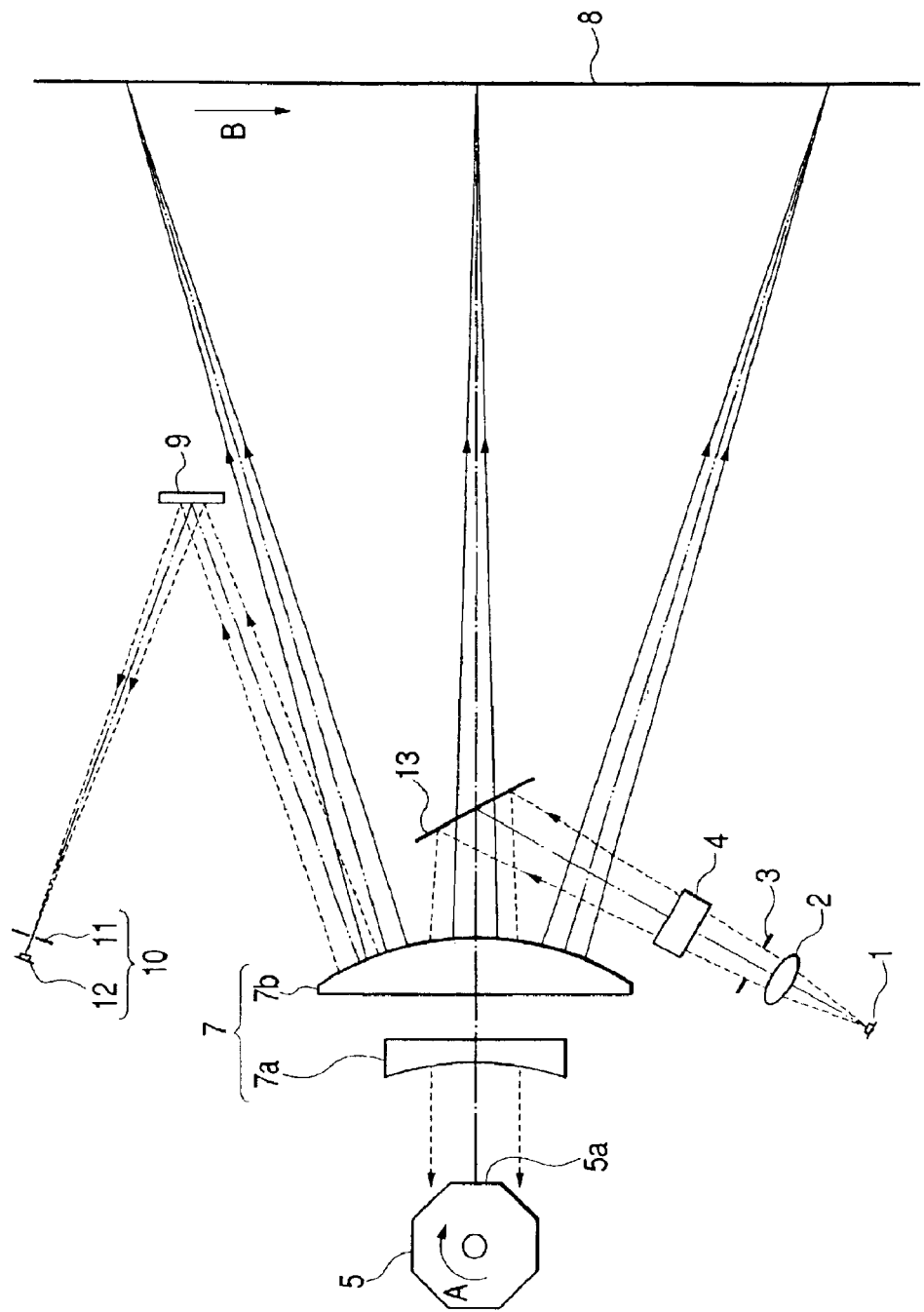
FIG. 1 is a main scanning sectional view in a first embodiment of the present invention.

FIG. 1 is a main scanning sectional view of a multi-beam optical scanning device in a first embodiment of the present invention.

In this description, a main scanning direction indicates a direction in which a light beam scans a surface to be scanned with optical scanning, and a sub-scanning direction indicates a direction perpendicular to the main scanning direction.

In the figure, reference numeral 1 denotes light source means consisting of a semiconductor laser array having, for example, two light emitting points. Reference numeral 2 denotes a condensing lens system constituted by one collimator lens, which converts two light beams emitted from the light source means 1 into divergent light beams. Reference numeral 3 denotes an aperture stop, which restricts a width of the divergent light beams from the collimator lens. Reference numeral 4 denotes a cylindrical lens having a predetermined refracting power only in the sub-scanning direction. The cylindrical lens focuses the divergent light beams as linear images longitudinal in the main scanning direction in the vicinity of a deflection facet 5a of deflection means 5 discussed later. The two divergent light beams having passed through the cylindrical lens 4 is returned by a minor 13 of an incident optical system. The divergent light beams are converted into parallel light beams by a scanning optical system 7 discussed later in the main scanning direction and directly pass through the scanning optical system 7 in the sub-scanning direction. Reference numeral 5 denotes deflection means consisting of a polygon minor with, for example, eight surfaces, which rotates at a constant speed in a direction of arrow A in the figure by drive means (not shown) of a motor. Reference numeral 7 denotes a scanning optical system having the fθ characteristic.

An fθ lens 7a has a negative power in the main scanning direction, and an fθ lens 7b has a positive power in the main scanning direction. A composite power in the main scanning direction of the scanning optical system 7 is positive.

The scanning optical system 7 has the two fθ lenses 7a and 7b and focuses light beams reflectively deflected by the deflection means 5 on a photosensitive drum surface 8 as a surface to be scanned, and corrects surface tilt of the deflection facet 5a of the deflection means 5. At this point, two light beams reflectively deflected by the deflection facet 5a of the deflection means 5 are guided onto the photosensitive drum surface 8 via the scanning optical system 7, and optically scan the photosensitive drum surface 8 simultaneously in a direction of arrow B as the polygon mirror 5 is rotated in the direction of arrow A.

Consequently, two scanning lines are formed on the photosensitive drum surface 8 to record an image. In addition, a part of the plurality of light beams reflectively deflected by the polygon mirror 5 are returned by a mirror for synchronous detection 9 to be guided to synchronous detection means 10 consisting of a slit 11 and an optical detection element (BD sensor) 12.

Figure 2A:
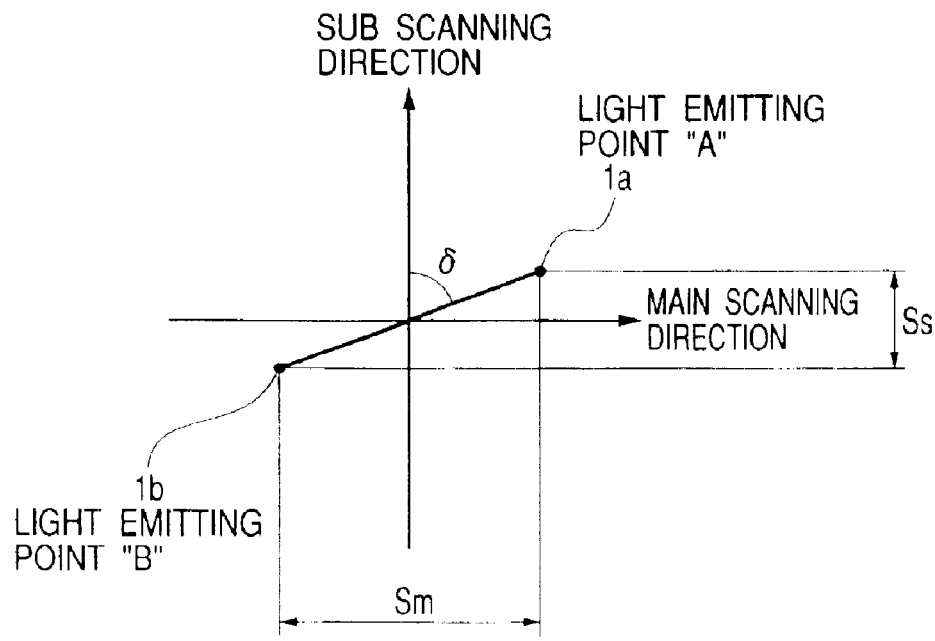
FIGS. 2A and 2B are main part schematic views illustrating a light source arrangement in the first embodiment of the present invention.

FIG. 2A shows an arrangement of two light emitting points 1a and 1b of the semiconductor laser array 1 in this embodiment.

In the semiconductor laser array 1 having the two light emitting points 1a and 1b used as light source means, an interval between the light emitting points 1a and 1b is 90 µm, and an interval Ss in the sub-scanning direction of the light emitting points 1a and 1b is adjusted to a desired value in order to adjust a scanning line pitch interval on the photosensitive drum surface 8 to be 42.3 µm equivalent to a pixel density of 600 dpi. Since the interval between the light emitting points 1a and 1b is larger than the desired interval Ss in the sub-scanning direction, the semiconductor laser array 1 is rotated by an angle δ. At this point, the two light emitting points 1a and 1b are also arranged to be spaced apart by an interval Sm in the main scanning direction.

Figure 2B:
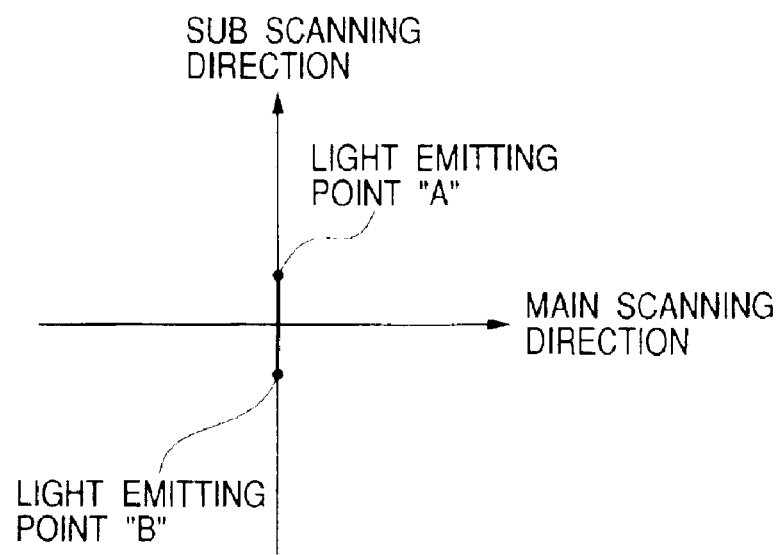

In this way, the two light emitting points 1a and 1b are arranged such that the rotation of the semiconductor laser array 1 can be adjusted rather than being arranged in parallel with the sub scanning direction (FIG. 2B). Consequently, a lateral magnification βs in the sub-scanning direction of all the optical systems, which are arranged in an optical path extending from the light source means 1 to the surface to be scanned 8, as a whole can be set freely.

This is extremely advantageous in terms of costs and miniaturization because it is unnecessary to reduce a lateral magnification in the sub-scanning direction using an expensive long optical element.

Next, a width in the main scanning direction of a light beam incident on the polygon mirror 5 will be described.

The plurality of divergent light beams emitted from the monolithic semiconductor laser 1 having the plurality of light emitting points 1a and 1b, which are arranged to be spaced apart in the main scanning direction as described above, are converted into parallel light beams by the collimator lens 2 and the scanning optical system 7, and is restricted to a size discussed later by the aperture stop 3 provided between and the scanning optical system 7 to be incident on the polygon mirror 5.

FIGS. 3(a) and 3(b) show schematically states of a light beam incident on the polygon mirror 5 within the main scanning section.

As shown in FIGS. 3(a) through 3(d), the deflection facet 5a of the polygon mirror 5 moves in the main scanning direction depending upon a position to be scanned. FIG. 3(a) shows a state in which a light beam is deflected toward a synchronous detection means. FIG. 3(b) shows a state in which a light beam is deflected toward a scanning start portion on the photosensitive drum surface 8 serving as a surface to be scanned. FIG. 3(c) shows a state in which a light beam is deflected toward an image center. FIG. 3(d) shows a state in which a light beam is deflected toward a scanning end portion.

From the viewpoint of elapse of time, the deflection facet 5a moves in the order of FIGS. 3(a) through 3(d). The position of FIG. 3(a) for deflecting a light beam to the synchronous detection means and the position of FIG. 3(d) for deflecting a light beam to the scanning end portion form both ends of an area in which the deflection facet 5a moves. Thus, both the two light beams emitted from the semiconductor laser array 1 serving as light source means are made incident on the polygon mirror 5 as light beams having a large width in the main scanning direction such that the states of FIGS. 3(a) through 3(d) of the deflection facet 5a are covered. Therefore, a light beam width Wi in the main scanning direction of a certain incident light beam in the figure is larger than an area Wp in which the deflection facet 5a exists in the states of FIGS. 3(a) through 3(d).

It is an extremely important element in eliminating defocus jitter, which is a subject of the present invention, to make an incident light beam cover the deflection facet when the incident light beam is deflected not only toward the surface to be scanned 8 but also toward the synchronous detection means.

As shown in FIG. 4, the synchronous detection means has a threshold level. A time when a deflected light beam passes through a slit to be incident on the BD sensor and an amount of the deflected light beam reaches a light amount specified as the threshold level is assumed to be a synchronous detection time. Consequently, if an incident light beam does not cover the deflection facet when it is deflected toward the synchronous deflection means, a light amount of a light beam to be incident on the synchronous detection means decreases and longer time is required until an amount of the light beam reaches the light amount of the threshold level. Thus, misalignment of starting positions for drawing scanning lines occurs. In addition, since a covered area of the deflection facet varies depending upon a light beam, a difference in light amount is generated and jitter occurs.

Therefore, it is important to increase a width of an incident light beam such that each light beam covers the deflection facet entirely when the deflection facet deflects the light beam toward the synchronous detection means.

FIG. 5 is a main part schematic view schematically illustrating a locus of a main beam of two light beams in an overfilled optical system of this embodiment. The overfilled optical system is characterized in that the deflection facet 5a of the polygon mirror 5 becomes a pupil for the scanning optical system 7. It has an advantage that, even in the case in which, since the plurality of light emitting points 1a and 1b of the light source means 1 are spaced apart in the main scanning direction, a plurality of light beams become non-parallel and are spaced apart from each other in the main scanning direction to be incident on the deflection facet 5a, a main beam (light beam center) of the respective light beams passes through the center of the deflection facet 5a. Consequently, the plurality of light beams deflected by the polygon mirror 5 pass through positions approximate to each other on the scanning optical system 7 when the plurality of light beams scan an identical position (e.g., a scanning start portion, an image center, or a scanning end portion) on the surface to be scanned 8 or on the slit 11 of the synchronous detection means 10.

On the other hand, in the underfilled optical system which is the conventional multi-beam optical scanning device, a pupil is the aperture stop 3 provided in the incident optical system, and a light beam incident on the deflection facet 5a of the polygon mirror 5 is directly reflected. As shown in FIG. 6, in the underfilled optical system, an interval between two deflected light beams is substantially equal to an interval when the light beams are incident on the polygon mirror 5, and the two light beams having reached the scanning optical system 7 with a large distance spaced apart from each other optically scan in the same positions on the surface to be scanned 8 and on the slit 11 of the synchronous detection means 10.

Here, a mechanism of occurrence of defocus jitter will be described.

Defocus jitter means misalignment of starting positions in the main scanning direction due to a difference in focus positions in the main scanning direction on the surface to be scanned 8 and oh the slit 11 of the synchronous detection means 10.

In the multi-beam optical scanning device which is provided with the light source means 1 having the plurality of light emitting points spaced apart from each other in the main scanning direction, a second light beam passes through a predetermined position at an interval of a certain time To since a preceding first light beam among a plurality of deflected light beams passes the predetermined position.

Figure 7:
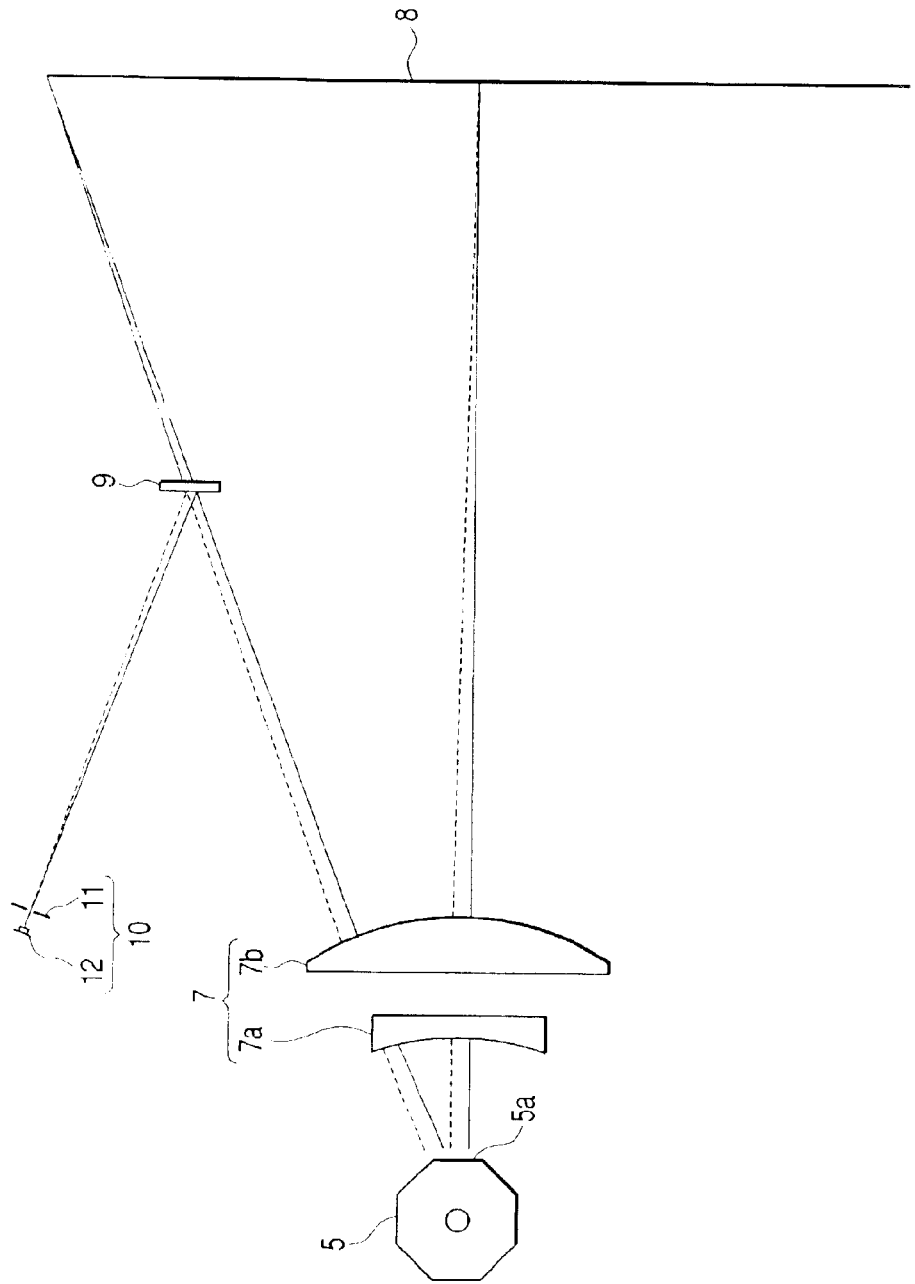
FIG. 7 is a view illustrating a state in which there is no defocus of a scanning optical system.

FIG. 7 is a main part schematic view schematically illustrating loci of a first light beam (solid line) and a second light beam (broken line) in the case in which focus positions in the main scanning direction on the surface to be scanned 8 and on the slit 11 of the synchronous detection means 10 are aligned. In this case, the time To since the preceding first light beam among a plurality of light beams deflected by the deflection facet 5a passes a predetermined position until the second light beam passes the predetermined position becomes equal on the surface to be scanned 8 and on the slit 11 of the synchronous detection means 10. That is, if the second light beam is emitted in delay of the time To after the preceding first light beam is emitted, the two deflected light beams can be aligned in a desired position in the main scanning direction to perform printing.

From a different point of view, an optical path of the preceding first light beam and an optical path of the second light beam in the state in which the second light beam is delayed by the time To cross in respective focus positions on the surface to be scanned 8 and on the slit 11 of the synchronous detection means 10 as shown in FIG. 7.

The case in which a focus position in the main scanning direction deviates from this state will now be described.

Figure 8:
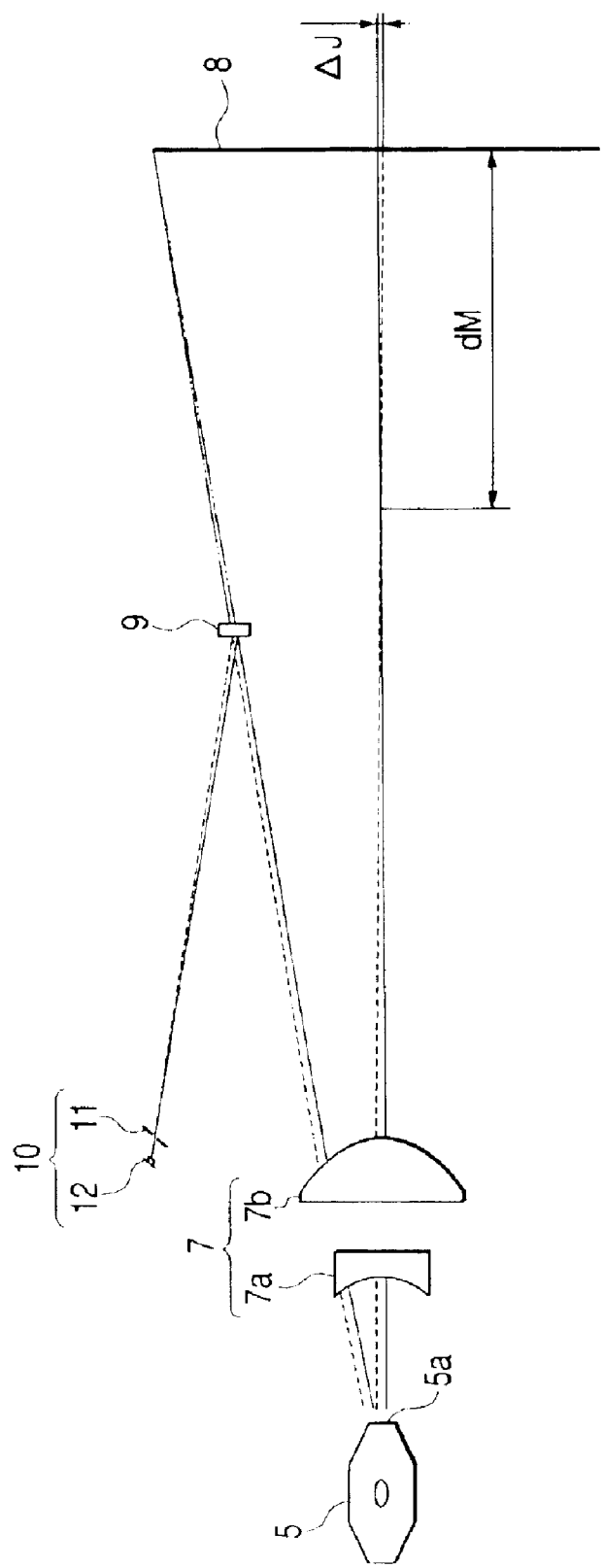
FIG. 8 is a view illustrating jitter due to defocus of a scanning optical system.

FIG. 8 is a view in which the preceding first light beam and the second light beam delayed by the time To, in the case in which a focus position deviates to the front by dM on the surface to be scanned 8, are drawn with one on top of the other.

In this case, although a plurality of deflected light beams also cross in the respective focus positions, a printing position in the main scanning direction deviates by ΔJ due to the misalignment of the focus positions on the surface to be scanned 8. That is, defocus jitter occurs.

Figure 9:
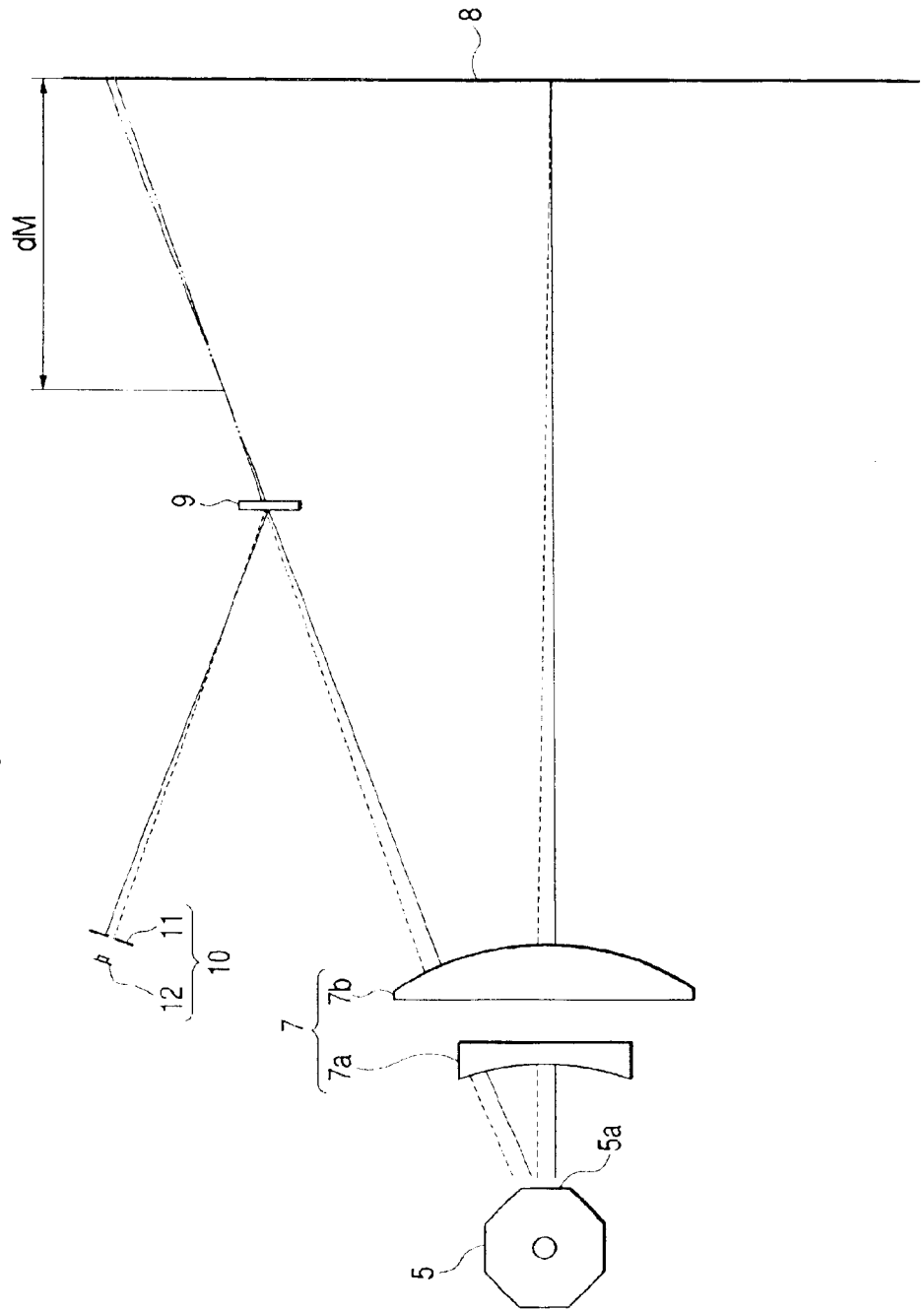
FIG. 9 is a view illustrating jitter due to defocus of a scanning optical system.
Figure 10:
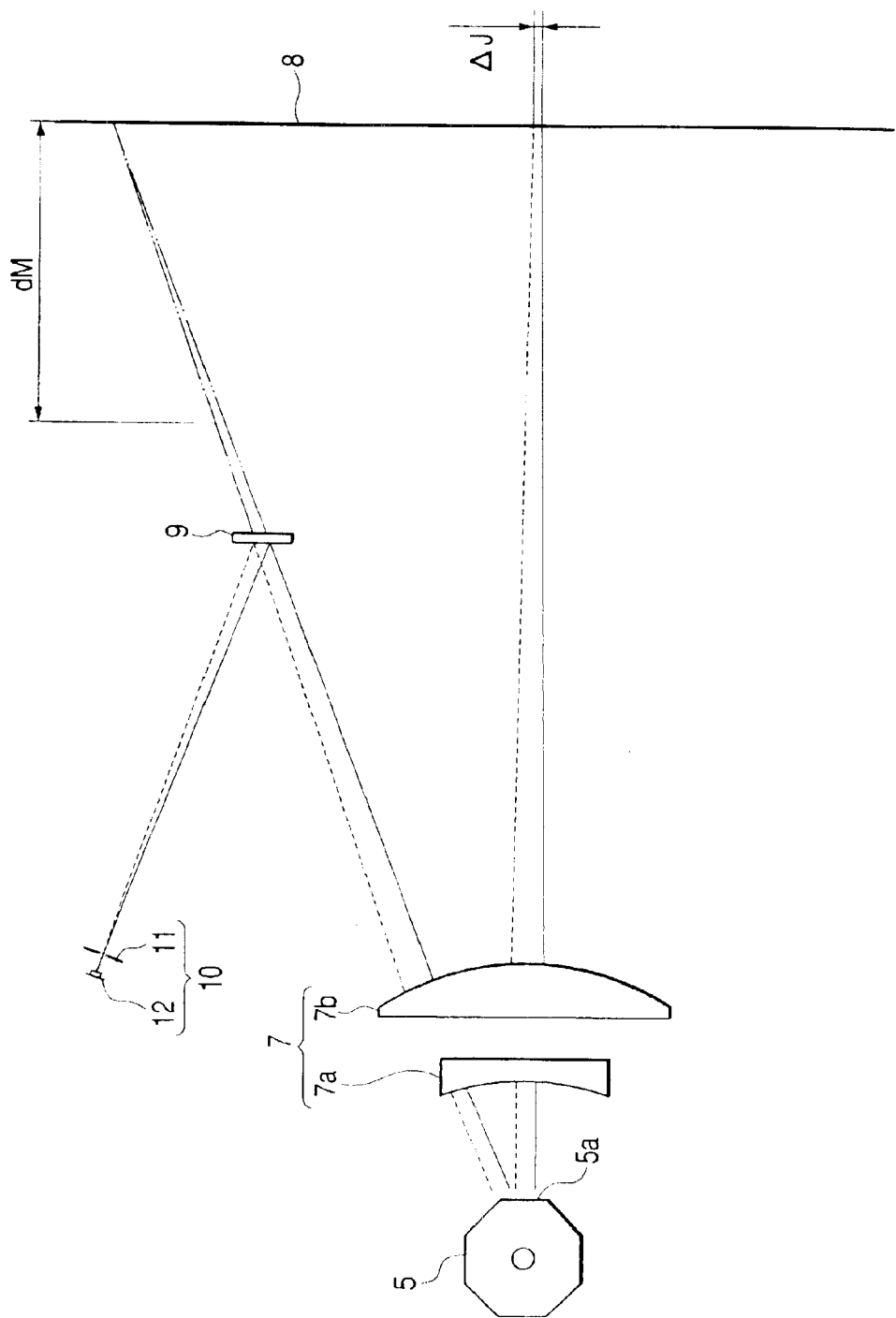
FIG. 10 is a view illustrating jitter due to defocus of a scanning optical system.

In addition, in the case in which there is no defocus on the surface to be scanned 8 and a focus position deviates by dM on the slit 11 of the synchronous detection means 10, positions in the main scanning direction where the plurality of deflected light beams reach come apart from each other as shown in FIG. 9. In this case, the time since the preceding first light beam optically scans the surface to be scanned until the second light beam optically scans the surface to be scanned becomes a time Tp which is different from To. Since scanning on the surface to be scanned 8 is started in a fixed time after timing detected by the synchronous detection means 10, misalignment of starting positions in the main scanning direction occurs between the preceding first light beam and the second light beam emitted after the time Tp as shown in FIG. 10. That is, misalignment of focus positions on the slit 11 of the synchronous detection means 10 causes a time difference of optical detection ΔT(ΔT=Tp−To), whereby defocus jitter occurs.

Figure 11:
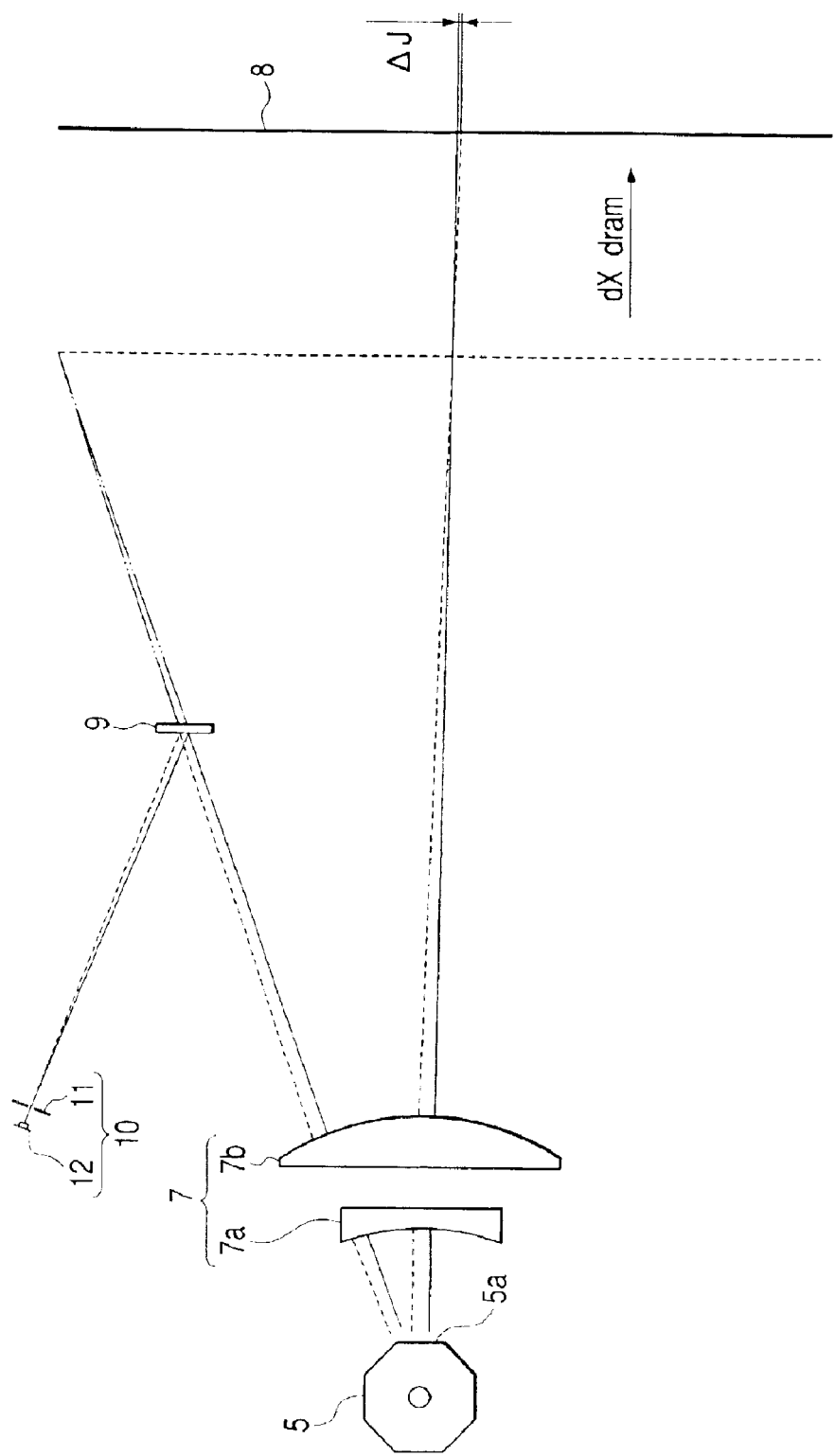
FIG. 11 is a view illustrating jitter due to deviation of a photosensitive drum position.

In this way, when focus positions in the main scanning direction on the surface to be scanned 8 and on the slit 11 of the synchronous detection means 10 are different, defocus jitter occurs. In particular, in the present invention, this defocus jitter is considered to be a problem. In addition, as shown in FIG. 11, when the photosensitive drum surface 8 serving as a surface to be scanned moves in the optical axis direction by dX_dram, focus positions become different as if misalignment of focus positions occurs on the surface to be scanned 8. Jitter therefore occurs by ΔJ. This jitter is drum eccentricity jitter which occurs even if a focus position of the scanning optical system 7 is just as designed. However, since a mechanism of occurrence is the same as the defocus jitter, it is possible to cope with this drum eccentricity jitter in the same manner as in the case of the defocus jitter.

The cause of the defocus jitter and the drum eccentricity jitter is that a plurality of light beams reach positions which are spaced apart in the main scanning direction on the scanning optical system 7 when the plurality of light beams scan an identical position on the surface to be scanned 8.

Thus, the overfilled optical system is used such that an interval between two light beams on the scanning optical system 7 is reduced. The aperture stop 3 serving as a pupil can also be arranged to be brought close to the deflection facet 5a in the underfilled optical system. However, there is a limit in a distance to be reduced, and the aperture stop 3 cannot be arranged on the deflection facet 5a. However, the overfilled optical system has a characteristic in that deflection facet 5a becomes a pupil, it is possible to cause the two light beams to reach positions adjacent to each other on the scanning optical system 7. Consequently, misalignment of starting positions in the main scanning direction can be suppressed even if focus positions of the scanning optical system 7 are misaligned. This applies not only to the case in which the surface to be scanned 8 is optically scanned but also to the case in which light beams scan the slit 11 of the synchronous detection means 10. Thus, it is possible to suppress jitter at the time when focus deviation occurs on the photosensitive drum surface 8 serving as a surface to be scanned and, moreover, it is possible to reduce shift of timing of synchronous detection due to misalignment of focus positions on the slit 11 of the synchronous detection means 10. That is, the overfilled optical system has an effect of reducing the defocus jitter.

However, it is necessary to constitute the overfilled optical system such that difference in a light amount does not occur in a plurality of light beams deflected toward the synchronous detection means 10.

Moreover, in this embodiment, in the overfilled optical system, in order to reduce shift of timing of synchronous detection due to misalignment of focus positions on the slit 11 of the synchronous detection means 10 such that an interval between two light beams on the scanning optical system 7 is reduced, it is preferable that conditions of expressions (10) and (12) below are satisfied. Details will be described in a third embodiment.

$$\{(\alpha \times Ldef)/(2 \times fk)\} \times \{\cos(Q/2) - \sin(Q/2) \times \tan \theta\} \leq 0.014 \quad (10)$$

$$\frac{Ldef \times \alpha}{2 \times fk} \leq 0.014 \quad (12)$$

Thus, as in the multi-beam optical scanning device of this embodiment, the light source means 1 is provided which has a plurality of light emitting points arranged around the optical axis of the collimator lens 2 such that a lateral magnification in the sub-scanning direction of all the optical systems can be set freely, and a plurality of light beams emitted from the light source means 1 are made incident on the polygon mirror 5 while keeping a width wide in the main scanning direction, respectively, such that the plurality of light beams cover an area in which the deflection facet 5a of the polygon mirror 5 moves in order to deflect a light beam toward an area of effective scanning on the photosensitive drum 8 and the synchronous detection means 10. Consequently, defocus jitter can be reduced. In addition, jitter caused by movement of a photosensitive drum in an optical axis direction can also be reduced.

In this embodiment, the present invention has been described with a semiconductor laser array having two light emitting points as an example. However, the present invention is not limited to this, and the effect of the present invention can be obtained sufficiently even if there are more, for example, three or four light emitting points. In addition, an effect equivalent to that of this embodiment can be obtained when surface light emitting lasers arranged one-dimensionally or two-dimensionally are used.

One or three or more elements in the scanning optical system have an equivalent effect. In addition, a scanning lens may be made of glass or plastic material.

Moreover, although a plurality of light beams incident on deflection means are assumed to be substantially parallel light beams in this embodiment, the present invention is not limited to this, and the effect of the present invention can be obtained sufficiently even if the plurality of light beams are convergent light beams or divergent light beams.

(Second Embodiment)

Figure 12:
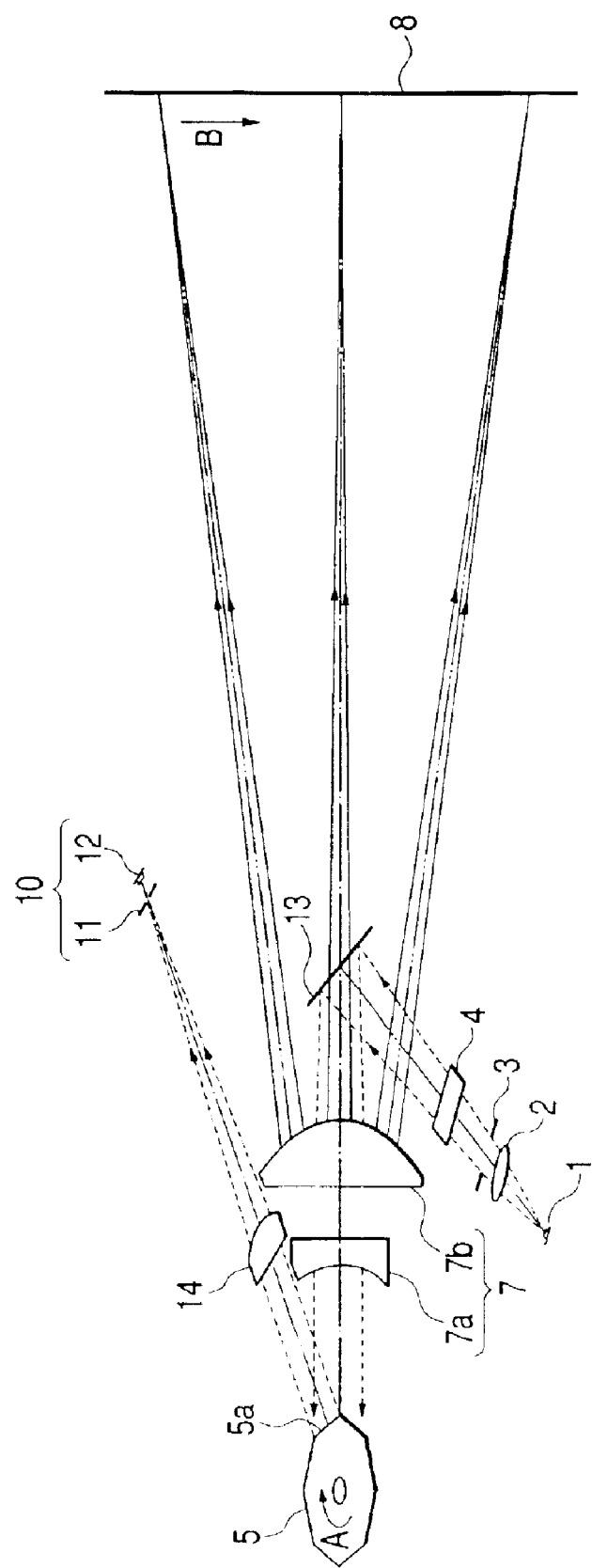
FIG. 12 is a main scanning sectional view in a second embodiment of the present invention.

FIG. 12 is a main scanning sectional view of a multi-beam optical scanning device in this embodiment.

This embodiment is different from the first embodiment in that, when a part of light beams deflected by a polygon mirror 5 serving as deflection means are guided to synchronous detection means 10, the light beams are guided via an optical system 14 for synchronous detection, which is an optical system different from the scanning optical system 7.

In this embodiment, the optical system 14 for synchronous detection is constituted by a single lens having an anamorphic power.

In the main scanning direction, a slit 11 of the synchronous detection means 10 is arranged to be placed in a focus position of the optical system 14 for synchronous detection, whereby parallel light beams deflected by the polygon mirror 5 is focused on the slit 11. In the sub-scanning direction, the deflection facet 5a of the polygon mirror 5 and the slit 11 of the synchronous detection means 10 are arranged to be in a conjugate relationship, whereby tilt correction of the deflection facet 5a of the polygon mirror 5 is conducted.

Here, there is an advantage that the multi-beam scanning apparatus can be made compact by setting a focal length in the main scanning direction of the optical system 14 for synchronous detection shorter than a focal length in the main scanning direction of the scanning optical system 7. In addition, there is also an advantage that costs can be reduced because the return mirror for synchronous detection 9 can be removed.

In particular, a largest advantage of guiding light beams via the optical system 14 for synchronous detection different from the scanning optical system 7 when the light beams are guided to the synchronous detection means 10 is that shift of timing does not occur, which is synchronously detected by the synchronous detection means 10 if a wavelength difference is generated in two light beams emitted from a semiconductor laser array 1 serving as light source means.

The synchronous detection means 10 is provided outside the effective area for scanning, and deflected light beams from the polygon mirror 5 pass a peripheral part of the lenses 7a and 7b, which constitutes the scanning optical system 7, distant from an optical axis thereof if the deflected light beams are guided to the synchronous detection means 10 via the scanning optical system 7. At this point, chromatic aberration of magnification of the scanning optical system 7 occurs if a wavelength difference is generated in two deflected light beams. In general, chromatic aberration of magnification tends to be larger as a scanning position is apart from an optical axis. It is maximized on the synchronous detection means 10 which is placed in a position most distant from the optical axis. Therefore, timing for synchronous detection shifts largely for each light beam depending upon chromatic aberration of magnification, and starting positions for drawing each scanning line are misaligned to cause misalignment of starting positions. That is, wavelength difference jitter occurs.

Thus, the part from the polygon mirror 5 to the synchronous detection means 10 is constituted by another optical system. More specifically, the optical system 14 for synchronous detection different from the scanning optical system 7 is provided, and the slit 11 of the synchronous detection means 10 is arranged on an optical axis of the optical system 14 for synchronous detection. Consequently, a second optical axis can be provided solely for an optical path to the synchronous detection means 10. The slit 11 of the synchronous detection means 10 is arranged on the second optical axis, whereby synchronous detection can be performed without being affected by chromatic aberration of magnification.

The focal distance in the main scanning direction of the optical system 14 for synchronous detection of this embodiment is set shorter than the focal length in the main scanning direction of the scanning optical system 7 to realize compactness of the multi-beam optical scanning device. However, this involves a problem in that defocus jitter due to misalignment of focus positions occurs more sensitively.

Here, assuming that a focal length fk in the main scanning of the scanning optical system 7 is 200 mm, a focal length fbd in the main scanning direction of the optical system 14 for synchronous detection is 50 mm, and a jitter amount at the time when a focus position deviates by dM (mm) on the slit of the synchronous detection means in the first embodiment is ΔJ1, a jitter amount ΔJ2 at the time when a focus position deviates dM (mm) on the slit of the synchronous detection means in this embodiment is calculated by the following expression:

$$\Delta J2 = (fk/fbd)^2 \times \Delta J1$$

That is, defocus jitter occurs which is larger by the square of the reciprocal of a ratio of the focal lengths in the main scanning directions of the optical system 14 for synchronous detection and the scanning optical system 7.

However, as in the first embodiment, since the overfilled optical system is also adopted in this embodiment, it is possible to pass two light beams in positions adjacent to each other on the optical system 14 for synchronous detection. Thus, even if misalignment of focus positions of the optical system 14 for synchronous detection occurs, shift of timing of synchronous detection can be controlled to be minimized. That is, the optical path to the synchronous detection means 10 is made compact.

Moreover, again, in this embodiment, in the overfilled optical system, in order to reduce shift of timing of synchronous detection due to misalignment of focus positions on the slit 11 of the synchronous detection means 10 such that an interval between two light beams on the scanning optical system 7 is reduced, it is preferable that conditions of expressions (10) and (12) below are satisfied. Details will be described in a third embodiment.

$$\{(\alpha \times Ldef)/(2 \times fk)\} \times \{\cos(Q/2) - \sin(Q/2) \times \tan \theta\} \leq 0.014 \quad (10)$$

$$\frac{Ldef \times \alpha}{2 \times fk} \leq 0.014 \quad (12)$$

In the multi-beam optical scanning device, defocus jitter can be reduced.

In addition, since the positions where the two light beams reach are adjacent to each other on the optical system 14 for synchronous detection, even if a wavelength difference is generated in the two light beams, shift of timing of synchronous detection due to on-axis chromatic aberration can be reduced to a slight amount which does not present a problem.

Thus, by using the optical system 14 for synchronous detection different from the scanning optical system 7 in the overfilled optical system as in this embodiment, a compact multi-beams optical scanning device can be provided which is not affected by a wavelength difference among a plurality of light beams and can always make timing of synchronous detection stable, in which the wavelength difference jitter is satisfactorily suppressed together with the defocus jitter and the drum eccentricity jitter.

The optical system 14 for synchronous detection of this embodiment may be constituted integrally with the cylindrical lens 4 and the fθ lenses 7a and 7b of the scanning optical system 7.

(Third Embodiment)

Figure 13:
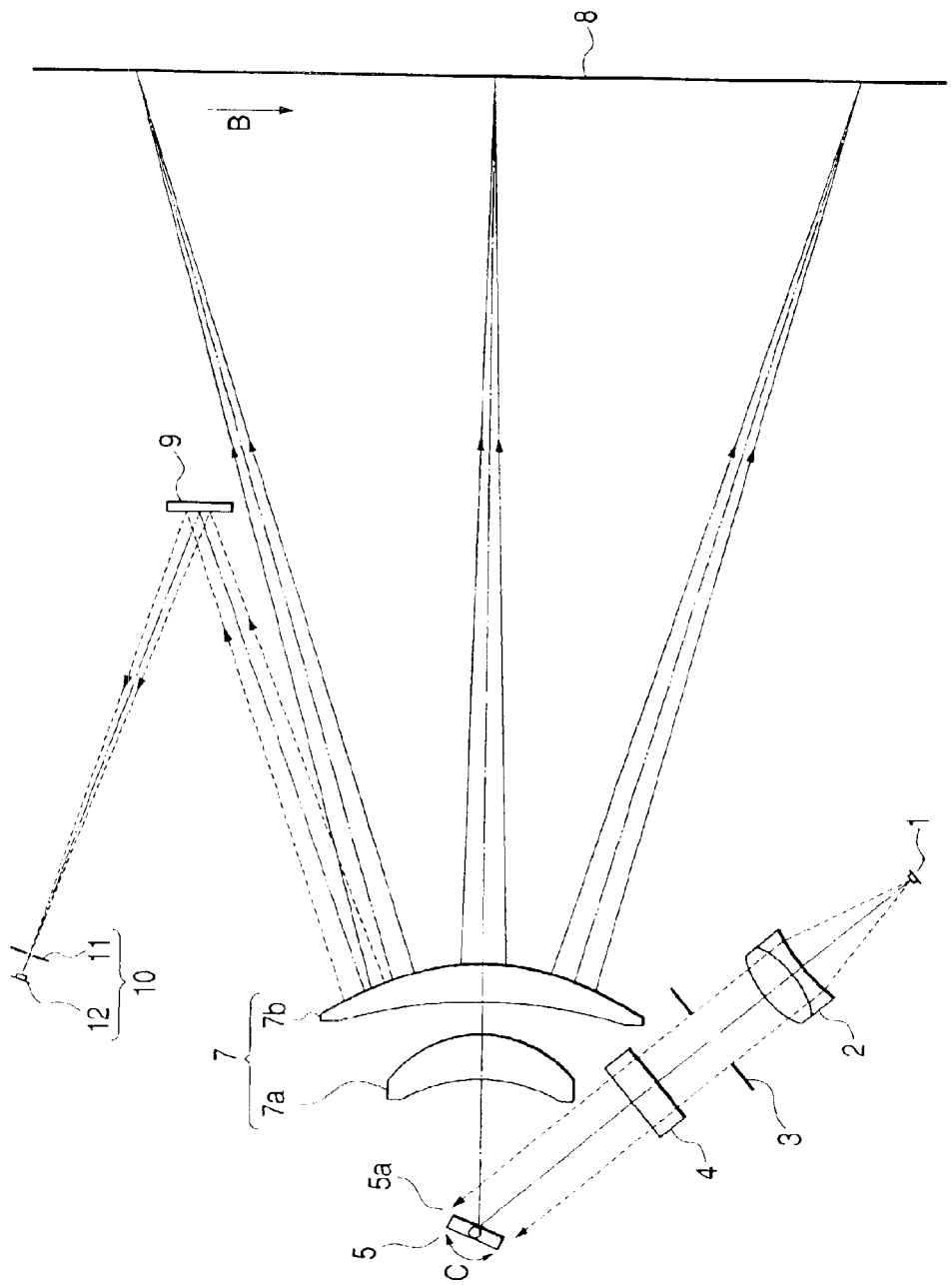
FIG. 13 is a main scanning sectional view in a third embodiment of the present invention.

FIG. 13 is a main scanning sectional view of a multi-beam optical scanning device in this embodiment.

In the figure, reference numeral I denotes light source means consisting of a semiconductor laser array having, for example, two light emitting points. Reference numeral 2 denotes a condensing lens system consisting of two lenses, a convex lens and a concave lens, adhered to each other. The condensing lens 2 converts two light beams emitted from the light source means 1 into parallel light beams. Reference numeral 3 denotes an aperture stop, which restricts a width of parallel light beams from the condensing lens system 2. Reference numeral 4 denotes a cylindrical lens having a predetermined refracting power only in a sub-scanning direction. The cylindrical lens 4 forms linear images of the light beams elongated in the main scanning direction in the vicinity of a deflection facet 5a of deflection means 5 discussed later. Reference numeral 5 denotes deflection means consisting of, for example, a plane mirror (galvano-mirror) having a reflective surface only on one side. The deflection means 5 reciprocates with sinusoidal vibration in a direction of arrow C in the figure by drive means (not shown) of a motor. Reference numeral 7 denotes a scanning optical system having the fθ characteristic. The scanning optical system has two fθ lenses 7a and 7b, focuses a light beam reflectively deflected by the deflection means 5 on a photosensitive drum surface 8 serving as a surface to be scanned, and conjugates the deflection facet 5a of the deflection means 5 and the photosensitive drum surface 8.

At this point, two light beams reflectively deflected by the deflection facet 5a of the deflection means 5 are guided onto the photosensitive drum surface 8 via the scanning optical system 7 and reciprocate the galvano-mirror 5 in the direction of arrow C so as to emit light beams only in a forward path of the reciprocation, thereby optically scanning the photosensitive drum surface 8 in the direction of arrow B simultaneously. Consequently, two scanning lines are formed on the photosensitive drum surface 8 to perform image recording.

In addition, a part of the plurality of light beams reflected and deflected by the galvano-mirror 5 are returned by a mirror 9 for synchronous detection and guided to synchronous detection means 10 consisting of a slit 11 and an optical detection element 12.

The galvano-mirror 5 includes one side among four sides in its main scanning section as the deflection facet 5a and reciprocates with sinusoidal vibration as indicated by the arrow C in the figure to deflect the two light beams emitted from the light source means 1. At this point, each light beam incident on the galvano-mirror 5 is adapted to be a light beam wide in the main scanning direction so as to cover an entire area in which the deflection facet 5a of the galvano-mirror 5 moves when it deflects light beams toward the entirety of an effective area for scanning on the surface to be scanned 8 and the synchronous detection means 10. In addition, although the galvano-mirror 5 vibrates sinusoidally, a shape of the two lenses 7a and 7b constituting the scanning optical system 7 is changed such that a moving speed of light beams on the surface to be scanned 8 becomes uniform.

Figure 14:
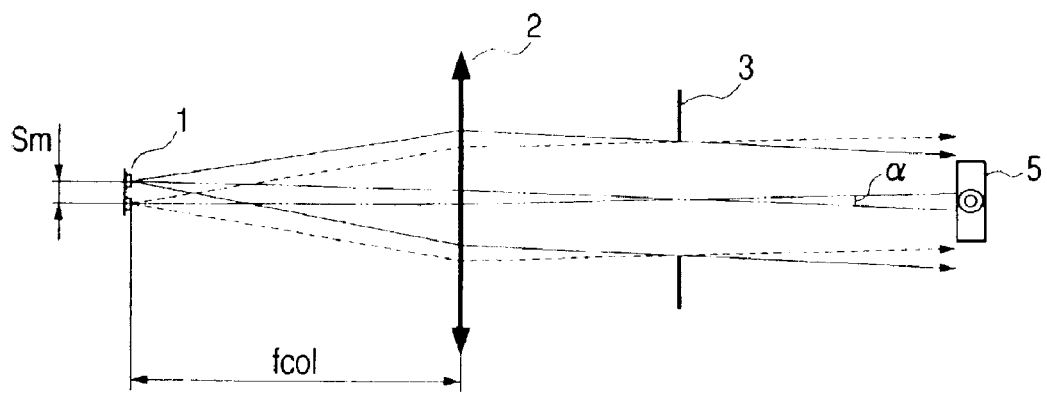
FIG. 14 is a view illustrating a state of incident light beams in the third embodiment of the present invention.

FIG. 14 is a main part schematic view of a main scanning section illustrating an optical path on which two light beams emitted from the light source means 1 of the multi-beam optical scanning device in this embodiment reach the deflection means 5.

Two light beams emitted from the light source means 1 having two light emitting point, which are spaced apart in the main scanning direction as shown in FIG. 2A, are converted by the condensing lens system 2 into parallel light beams and have its width limited by the aperture stop 3 to be incident on the deflection means 5.

At this point, the plurality of light beams are incident on the deflection means 5 with a certain angle α (rad) rather than being parallel with each other.

Figure 15:
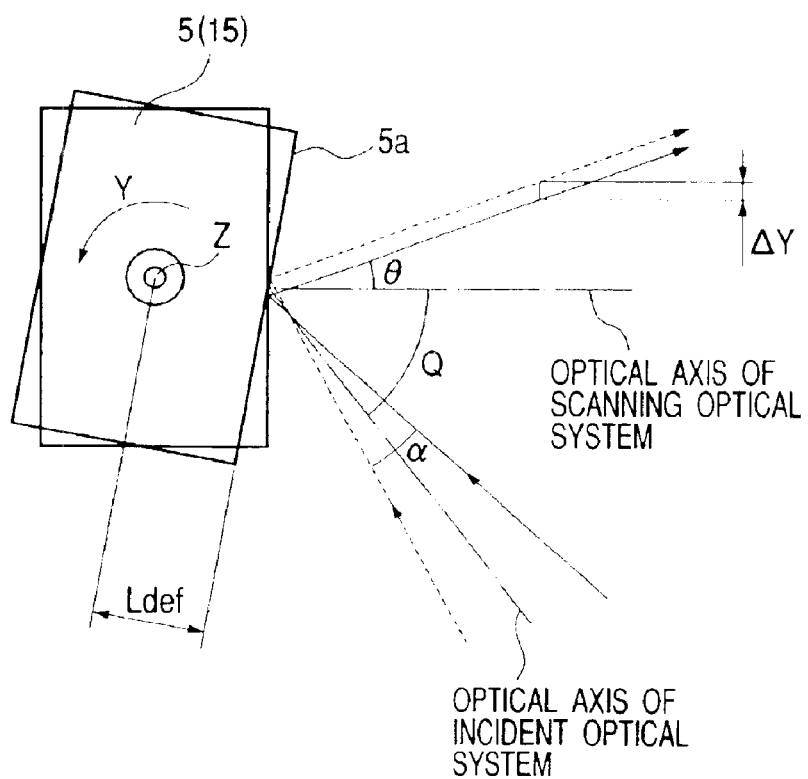
FIG. 15 is a view illustrating a state of deflection in the third embodiment of the present invention.

FIG. 15 is a main part schematic view of a main scanning section illustrating a state of the deflection means 5 when it deflects two light beams emitted from the light source means 1 of the multi-beam optical scanning device in this embodiment to an identical position on the surface to be scanned 8.

In the case in which respective light beams incident on the deflection means 5 are parallel light beams as in this embodiment, in order to be scanned in an identical position on the surface to be scanned 8, it is necessary to, when a second light beam (broken line) is deflected, rotate the deflection means 5 by a very small angle γ with respect to an angle at which a first light beam (solid line) is deflected and make the two light beams parallel with each other after the light beams are deflected by the deflection means 5. At this point, it is sufficient to rotate the deflection means 5 at an angle γ (rad) which is half an angle α defined between the two light beams when the light beams are incident on the deflection means 5, that is, γ=α/2 (rad). Usually, the second light beam is emitted in delay of a time which the deflection means 5 requires for rotating by γ=α/2 (rad) since the first light beam is emitted, whereby printing is performed in the same position in the main scanning direction on the surface to be scanned 8 to form a vertical line.

Here, in the case in which a plurality of light beams emitted from a plurality of emitting points are converted into parallel light beams, convergent light beams, or divergent light beams in the common condensing lens system 2 as in the multi-beam optical scanning device of this embodiment, assuming that an interval in a main scanning direction of two light emitting points is Sm (mm) and a focal length in a main scanning direction of the condensing lens system 2 is fcol (mm), the angle α (rad) defined between the two light beams when the light beams are incident on deflection means is represented by the following expression:

$$\alpha = A\tan(Sm/fcol) \qquad <1>$$

In addition, when X<<1, since A tan X≈X, expression <1> can be approximated as follows:

$$\alpha \approx sm/fcol \qquad <2>$$

Even in the overfilled optical system, two light beams deviate from each other on each lens of a scanning optical system by an amount of movement of a deflection facet following a rotation angle γ of deflection means. Here, when a rotation angle of the deflection means is assumed to be γ (rad), a distance from a rotation center of the deflection means to the deflection facet is assumed to be Ldef (mm), a focal length in a main scanning direction of the scanning optical system is assumed to be fk (mm), an angle (incidence angle in the main scanning direction) defined between an incident optical system and the scanning optical system is assumed to be Q (rad), and a field angle is assumed to be θ (rad), a deviation amount of a printing position (jitter amount) in the main scanning direction at the time when focus of the scanning optical means deviates 1 mm is represented by the following expression:

$$\Delta J = \frac{2 \times Ldef \times \sin\left(\frac{\gamma}{2}\right)}{fk} \times \left\{\cos\left(\frac{Q}{2}\right) - \sin\left(\frac{Q}{2}\right) \times \tan\theta\right\} \qquad <3>$$

It is seen from expression <3> that a defocus jitter amount is proportional to a distance Ldef from the rotation center of the deflection means to the deflection facet.

Thus, in this embodiment, the distance Ldef from the rotation center of the deflection means to the deflection facet is set small using a galvano-mirror.

Figure 16:
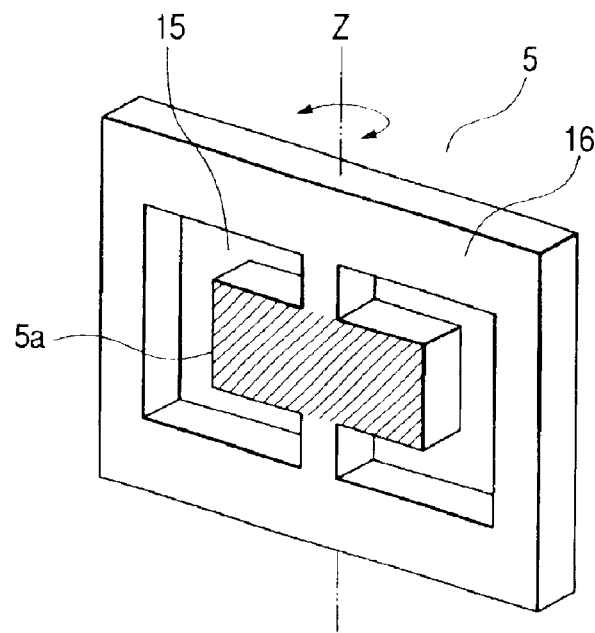
FIG. 16 is a perspective view of deflection means in the third embodiment of the present invention.

FIG. 16 is a perspective view of the galvano-mirror 5 serving as deflection means of this embodiment. In the figure, reference numeral 15 denotes a deflection element and 16 denotes a holding member for holding the deflection element 15.

Figure 17A:
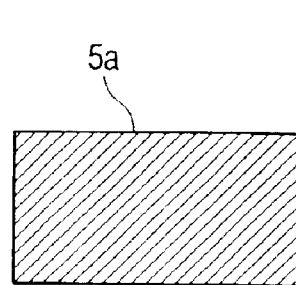
FIGS. 17A and 17B are sectional views of a deflection element in the third embodiment of the present invention.
Figure 17B:
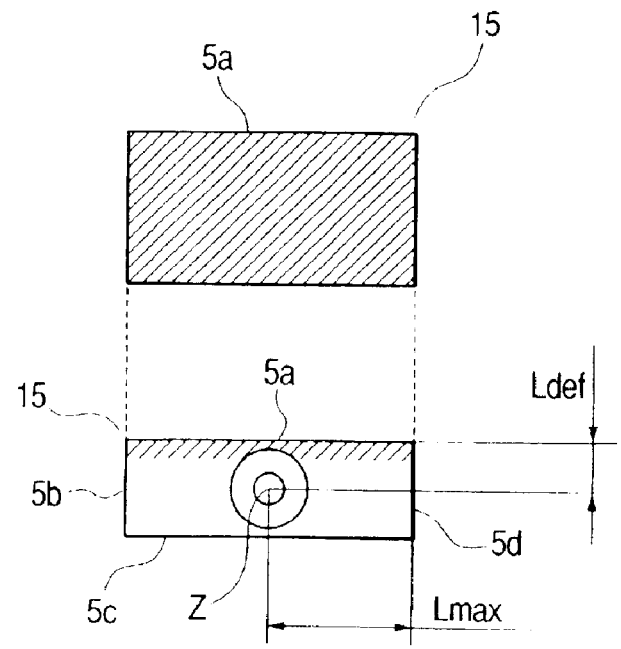

FIG. 17A is a sub-scanning sectional view (front view) of the deflection element 15 and FIG. 17B is a main scanning sectional view (top view) of the deflection element 15.

Among four sides 5a, 5b, 5c, and 5d in the main scanning direction of the deflection element 15, only the side 5a is subjected to mirror-finish as a deflection facet, and the deflection element 15 is reciprocated around a rotation axis Z.

Here, a distance from the rotation center (rotation axis Z) of the deflection element 15 to the deflection facet 5a is set shorter than a distance from the sides 5b and 5d, which are most distant from the rotation center among the sides 5a, 5b, 5c, and 5d, to the rotation center. This is for suppressing the defocus jitter amount as in expression <3>.

When a distance from the rotation center (rotation axis Z) of the deflection element 15 to the deflection facet 5a is assumed to be Ldef and a distance from the sides 5b and 5d, which are most distant from the rotation center among the sides of the deflection element 15, to the rotation center is assumed to be Lmax, a condition of the following expression is satisfied:

$$Ldef < Lmax \qquad <4>$$

It is desirable to satisfy the condition of expression <4> in order to reduce defocus jitter.

In addition, expression <3> can be divided into a first half term and a second half term.

The second half term is represented as follows:

$$f() = \cos\left(\frac{Q}{2}\right) - \sin\left(\frac{Q}{2}\right) \times \tan\theta \qquad <5>$$

Defocus jitter $\Delta J$ is proportional to a value of expression <5>.

FIG. 18 is a table in which a field angle $\theta$ defined between a main beam of light beams deflected by the deflection facet 5a and an optical axis of the scanning optical system 7 is set on the vertical axis (direction) and an angle (incidence angle in the main scanning direction) Q defined between an optical axis of the incident optical system 2, 3, and 4 and an optical axis of the scanning optical system 7 is set on the horizontal axis (direction) to calculate the value of expression <5>.

This table indicates that defocus jitter is larger in points where an absolute value of a numerical value is large.

In the case in which light beams are made incident on the deflection means 5 to be parallel with the scanning optical system 7, that is, Q=0 (rad), a numerical value is "1.000" at each field angle. It is needless to mention that an average value of numerical values at the respective field angles is also "1.000". On the other hand, in the case in which light beams are made incident on the deflection means 5 with an angle in the main scanning direction with respect to the optical axis of the scanning optical system 7, that is, $\theta>0$, an average value of numerical values at the respective field angles is smaller than "1.000". Thus, an average value of defocus jitter can be controlled to be smaller when light beams are made incident on the deflection means 5 with an angle in the main scanning direction with respect to the optical axis of the scanning optical system.

Moreover, if a maximum value of the field angle $\theta$ is set to ¼ or less of the incidence angle Q, a numerical value can be reduced to a value smaller than "1.000" in all the field angles. That is, when a maximum value of a field angle is assumed to be $\theta$max, if the following condition is satisfied, a multi-beam optical scanning device with defocus jitter further reduced can be realized:

$$\theta \text{max} \leq Q/4 \qquad <6>$$

In addition, in the case in which the optical axis of the incident optical systems 2, 3, and 4 and the optical axis of the scanning optical system 7 are parallel with each other, as described above, a calculation value of expression <5> is "1.00" in all the field angles $\theta$. This indicates that an amount of jitter, which occurs in the case in which a focus position of the scanning optical system deviates by the same amount at each field angle or the case in which a photosensitive drum surface deviates, becomes constant.

Thus, a time for synchronous detection is changed by an amount equivalent to jitter which has occurred, so that the jitter can be corrected.

There are several methods for adjusting a synchronizing time.

For example, there are a method of causing defocus jitter in the opposite direction to occur by moving a slit of synchronous detection means to the front or the back to deviate a focus position as if a focus position deviates on the slit of synchronous detection means, a method of slanting a slit of synchronous detection means to deviate a position through which light beams pass the slit for each light beam, and a method of providing a delay circuit in synchronous detection means to electrically correct the time.

In this way, if a mechanism for adjusting starting timing for drawing each scanning line is provided, jitter can be corrected even in the case in which an optical axis of an incident optical system and an optical axis of a scanning optical system are made parallel with each other.

Expression <3> will be further developed.

When X<<1, since sin X≡X, expression <3> can be approximated as follows:

$$\Delta J = \frac{Ldef \times \gamma}{fk} \times \left\{\cos\left(\frac{Q}{2}\right) - \sin\left(\frac{Q}{2}\right) \times \tan\theta\right\} \qquad <7>$$

In addition, a relationship between an angle $\alpha$ (rad) defined between two light beams incident on deflection means and an angle $\gamma$ (rad) with which the deflection means rotates in order to make two deflected light beams parallel with each other is as follows:

$$\gamma = \alpha/2 \qquad <8>$$

Thus, when expression <8> is substituted for expression <7>, the following expression is obtained:

$$\Delta J = \frac{Ldef \times \alpha}{2 \times fk} \times \left\{\cos\left(\frac{Q}{2}\right) - \sin\left(\frac{Q}{2}\right) \times \tan\theta\right\} \qquad <9>$$

Thus, the defocus jitter can also be suppressed by controlling a value of expression <9> to be small.

In general, jitter equivalent to ⅓ of one pixel, which depends on a pixel density in the main scanning direction, may be allowed.

At 600 (dpi), one pixel is approximately 42 $\mu$m, and ⅓ of which is 14 $\mu$m.

In addition, since it is possible that defocus also occur by 1 mm, it is desirable to set a calculation value of expression <9> to 14 $\mu$m or less.

$$\{(\alpha \times Ldef)/(2 \times fk)\} \times \{\cos(Q/2) - \sin(Q/2) \times \tan\theta\} \leq 0.014 \qquad (10)$$

From FIG. 18, $\cos(Q/2) - \sin(Q/2) \times \tan\theta$ is $1 \pm \Delta$ (very small value) in the scanning optical system, this can be approximated as $\cos(Q/2) - \sin(Q/2) \times \tan\theta = 1$.

Consequently, it is seen that the defocus jitter can be substituted as follows:

$$g() = \frac{Ldef \times \alpha}{2 \times fk} \quad (11)$$

That is, the defocus jitter only has to satisfy a condition of the following expression:

$$\frac{Ldef \times \alpha}{2 \times fk} \leq 0.014 \quad (12)$$

In addition, in the structure for converting light beams from two light emitting points spaced apart in the main scanning direction into parallel light beams by an identical condensing lens system as in this embodiment, since expression <1> is established, expression (11) can be converted into the following expression when approximation <2> is substituted for expression (11):

$$\frac{Ldef \times Sm}{2 \times fcol \times fk} \leq 0.014 \quad (13)$$

That is, the defocus jitter only has to satisfy a condition of expression (13).

In this embodiment, Ldef=2 mm, Sm=0.0897 mm, fcol=20 mm, and fk=200 mm, and the defocus jitter is controlled to be a very small value as follows:

$$\frac{Ldef \times Sm}{2 \times fcol \times fk} = 0.000022 \quad (14)$$

Consequently, an amount of jitter which occurs in the event of misalignment of focus positions of scanning optical means can be controlled to be smaller than that in the first embodiment. In addition, jitter which occurs in the case in which a photosensitive drum decenters can also be reduced in the same manner.

In the case in which light beams pass through another optical element such as a scanning optical system other than a condensing lens system in a part from light source means to deflection means as in the first embodiment, it is sufficient to calculate jitter assuming that all the optical elements from the light source means to the deflection means form an incident optical system and a focal distance in the main scanning direction of the incident optical system is fcol.

Also, in the case in which an optical system for synchronous detection is used as in the second embodiment, jitter due to misalignment of focus positions of the optical system for synchronous detection can be controlled to be small in the same manner as this embodiment.

Therefore, a multi-beam optical scanning device can be proposed with which satisfactory images with jitter further reduced can be always obtained by appropriately selecting a structure of deflection means.

In this embodiment, an example in which a galvano-mirror is used as deflection means has been explained. However, the present invention is not limited to this, and the same effect can also be obtained in the case in which a polygon mirror which has a plurality of deflection facets around a rotation axis as in the first and second embodiments and in which distances from the rotation axis to the deflection facets are not fixed.

(Fourth Embodiment)

FIG. 19 is a perspective view of a galvano-mirror 5 in this embodiment. FIGS. 20A and 20B are a sub scanning sectional view and a main scanning sectional view of the galvano-mirror 5, respectively.

This embodiment is different from the third embodiment in that the rotation axis Z of the galvano-mirror 5 is arranged in a position along a deflection facet thereof.

As shown in FIG. 20B, a distance Ldef from a deflection facet 5*a* to a rotation center (rotation axis Z) of a deflection element 15 is 0 mm. By using this deflection means, a multi-beam optical scanning device, in which defocus jitter does not occur judging from expression <3>, can be realized.

(Fifth Embodiment)

Figure 21:
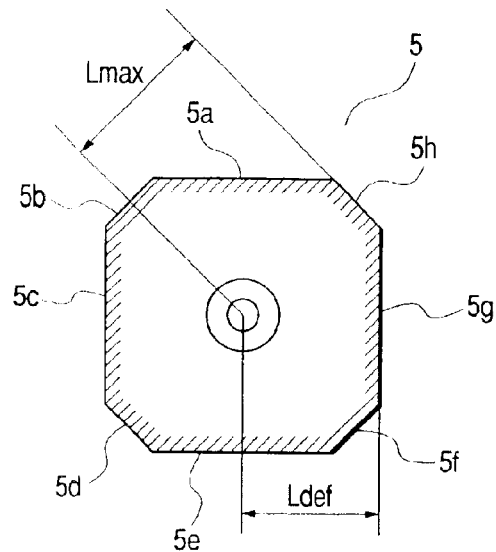
FIG. 21 is a view illustrating deflection means in a fifth embodiment of the present invention.

FIG. 21 is a main part schematic view in a main scanning direction of deflection means of this embodiment.

This embodiment is different from the first embodiment in that the deflection means shown in FIG. 21 is used.

The deflection means of this embodiment has eight sides 5*a* to 5*h* in the main scanning direction. A distance from a rotation center of the deflection means to the sides 5*a*, 5*c*, 5*e*, and 5*g* and a distance from a rotation center of the deflection means to the sides 5*b*, 5*d*, 5*f*, and 5*h* are different. The former is shorter than the latter.

Thus, only the sides 5*a*, 5*c*, 5*e*, and 5*g* are subjected to mirror-finish to be used as deflection facets, so that a multi-beam optical scanning device with defocus jitter reduced can be provided.

In this case, assuming that the distance from the sides 5*a*, 5*c*, 5*e*, and 5*g* to the rotation center is Ldef and the distance from the sides 5*b*, 5*d*, 5*f*, and 5*h* to the rotation center is Lmax, the condition of expression <4> is satisfied.

(Sixth Embodiment)

Figure 22:
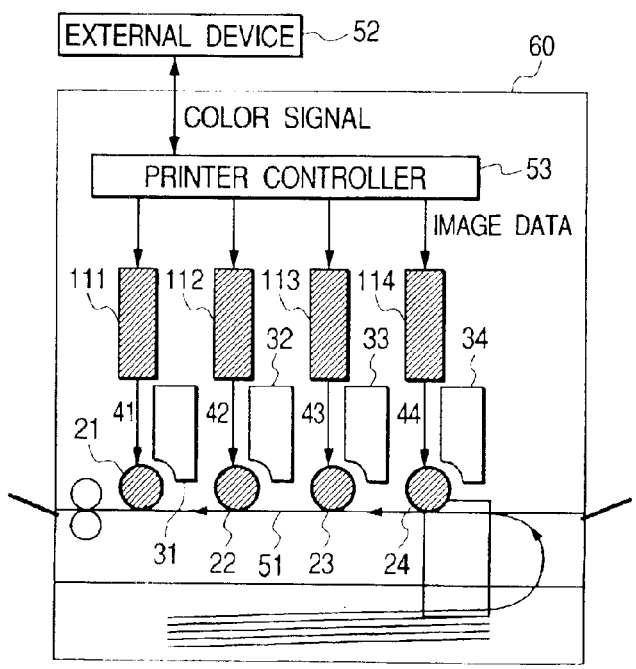
FIG. 22 is a main part schematic view of a color image forming apparatus of the present invention.

FIG. 22 is a main part schematic view of a color image forming apparatus of a sixth embodiment of the present invention. This embodiment is a color image forming apparatus of a tandem type in which four optical scanning devices are aligned and record image information on photosensitive drums serving as image bearing members in parallel with each other. In FIG. 22, reference numeral 60 denotes a color image forming apparatus; 111, 112, 113, and 114, optical scanning devices having any one of the structures described in the first to fifth embodiments; 21, 22, 23, and 24, photosensitive drums serving as image bearing members; 31, 32, 33, and 34, developers, and 51, a conveyor belt.

In FIG. 22, color signals of R (red), G (green), and B (blue) are inputted from an external device 52 such as a personal computer to the color image forming apparatus 60. These color signals are converted into image data (dot data) of C (cyan), M (magenta), Y (yellow), and B (black), respectively, by a printer controller 53 in the apparatus. The image data are inputted in the optical scanning devices 111, 112, 113, and 114, respectively. Then, light beams 41, 42, 43, and 44 modulated according to respective image data are emitted from these optical scanning devices. Photosensitive surfaces of the photosensitive drum 21, 22, 23, and 24 are scanned in the main scanning direction by these light beams.

In the color image forming apparatus of this embodiment, the four optical scanning devices 111, 112, 113, and 114 are aligned, which correspond to colors of C (cyan), M (magenta), Y (yellow), and B (black), respectively, and record image signals (image information) on the photosensitive drums 21, 22, 23, and 24, respectively, in parallel with each other. Thus, the color image forming apparatus prints a color image at a high speed.

The color image forming apparatus of this embodiment forms latent images of these colors on the corresponding photosensitive drums 21, 22, 23, and 24, respectively, using light beams based on respective image data with the four optical scanning devices 111, 112, 113, and 114 as described above. Thereafter, the latent images are multiple transferred to form one full-color image.

As the external device 52, for example, a color image reading apparatus provided with a CCD sensor may be used. In this case, a color digital copying machine is constituted by this color image reading apparatus and the color image forming device 60.

Note that, in each embodiment of the present invention, the multi-beam optical scanning device for optically scanning two light beams is described as an example. However, the present invention is not limited to this. For example, in accordance with the present invention, a multi-beam optical scanning device, which optically scans a larger number of light beams such as four or eight light beams simultaneously, enjoys a larger effect of reducing jitter of each kind described above.

In addition, in each embodiment of the present invention, the monolithic semiconductor laser having two light emitting points is used as light source means. However, the present invention is not limited to this. One or a plurality of light beams emitted from the respective light emitting points may be composited using composition means such as a prism and the composited light beam may be made incident on deflection means. Alternatively, one or a plurality of light beams emitted from the respective light emitting points may be made incident on the deflection means directly.

The effect of the present invention resides in providing a multi-beam optical scanning device which can reduce defocus jitter even if light source means which has a plurality of light emitting points arranged to be spaced apart in the main scanning direction is used. In addition, drum eccentricity jitter can also be reduced.

What is claimed is:

1. A multi-beam optical scanning device comprising:

light source means having a plurality of light emitting points spaced apart at least in a main scanning direction;

deflection means for deflecting a plurality of light beams emitted from the light source means;

a scanning optical system for focusing the plurality of light beams deflected by the deflection means on a surface to be scanned; and synchronous detection means for detecting timing at which the plurality of light beams start scanning in an effective scanning area on the surface to be scanned, wherein a width in the main scanning direction of each of the plurality of light beams incident on the deflection means is wider than the width in the main scanning direction of an area of movement of a deflection facet of the deflection means for which the deflection facet is effective to deflect the plurality of light beams emitted from the light source means toward the entire effective scanning area on the surface to be scanned and toward the synchronous detection means provided outside the effective scanning area, and wherein, when an angle defined in the main scanning direction by principal rays of the plurality of light beams emitted from the light source means when the plurality of light beams emitted from the light source means when the plurality of light beams are incident on the deflection means is assumed to be $\alpha$ (rad), a distance from the deflection facet of the deflection means to a rotation center of the deflection means is assumed to be Ldef (mm), a focal length in the main scanning direction of the scanning optical system is assumed to be fk (mm), an angle defined in the main scanning direction between an optical axis of an incident optical system, which directs the light beams emitted from the light source means onto the deflection facet and an optical axis of the scanning optical system is assumed to be Q (rad), and a field angle in the main scanning direction defined between the principal ray of light beam deflected by the deflection facet and the optical axis of the scanning optical system is assumed to be $\theta$ (rad), the following expression is satisfied:

$$\{(\alpha \times Ldef)/(2 \times fk)\} \times \{\cos(Q/2) - \sin(Q/2 \times \tan\theta\} \leq 0.014.$$

2. A multi-beam optical scanning device according to claim 1, wherein an optical axis of an incident optical system provided between the light source means and the deflection means has an angle in the main scanning direction with respect to an optical axis of the scanning optical system.

3. A multi-beam optical scanning device according to claim 1, wherein an optical axis of an incident optical system provided between the light source means and the deflection means in the main scanning direction is parallel with an optical axis of the scanning optical system.

4. A multi-beam optical scanning device according to claim 1, wherein, when a distance from a side most distant apart from the rotation center of the deflection means among sides of the deflection means within a main scanning section to the rotation center of the deflection means is assumed to be Lmax (mm), the following expression is satisfied:

Ldef<Lmax.

5. A multi-beam optical scanning device according to claim 1, wherein the deflection means comprises a polygon mirror.

6. A multi-beam optical scanning device according to claim 1, wherein the deflection means comprises a galvano-mirror.

7. A multi-beam optical scanning device according to claim 1, wherein a part of the plurality of light beams deflected by the deflection means are guided to the synchronous detection means via an optical system for synchronous detection which is different from the scanning optical system.

8. A multi-beam optical scanning device according to claim 1, wherein the light source means comprises a monolithic semiconductor laser.

9. A multi-beam optical scanning device according to claim 1, wherein the plurality of light beams emitted from the light source means are combined by combining means and guided to the deflection means.

10. An image forming apparatus, comprising:

a multi-beam optical scanning device as set forth in claim 1;

a photosensitive member arranged on the surface to be scanned;

a developing device for developing as a toner image an electrostatic latent image that is formed on the photosensitive member by scanning with the optical scanning device using light beams;

a transfer device for transferring the developed toner image onto a transfer medium; and a fixing device for fixing the transferred toner image on the transfer medium.

11. An image forming apparatus comprising:

a multi-beam optical scanning device according to claim 1; and a printer controller for converting code data inputted from an external device into an image signal to input the image signal in the optical scanning device.

12. A color image forming apparatus comprising:

a plurality of scanning optical devices each including a multi-beam optical scanning device according to claim 1; and a plurality of image bearing members which are arranged on surfaces to be scanned of the respective optical scanning devices and form images of colors that are different from each other.

13. A color image forming apparatus according to claim 12, further comprising:

a printer controller for converting a color signal inputted from an external device into image data of different colors to input the data in the respective optical scanning devices.

14. A multi-beam optical scanning device comprising:

light source means having a plurality of light emitting points spaced apart at least in a main scanning direction;

deflection means for deflecting a plurality of light beams emitted from the light source means; and a scanning optical system for focusing the plurality of light beams deflected by the deflection means on a surface to be scanned; and synchronous detection means for detecting timing at which the plurality of light beams start scanning in an effective scanning area on the surface to be scanned, wherein a width in the main scanning direction of each of the plurality of light beams incident on the deflection means is wider than a width in the main scanning direction of an area of movement of a deflection facet of the deflection means for which the deflection facet is effective to deflect the plurality of light beams emitted from the light source means toward the entire effective scanning area on the surface to be scanned and toward the synchronous detection means provided outside the effective scanning area, and wherein, when an angle defined in the main scanning direction by principal rays of the plurality of light beams emitted from the light source means when the plurality of light beams are incident on the deflection means is assumed to be $\alpha$ (rad), a distance from the deflection facet of the deflection means to a rotation center of the deflection means is assumed to be Ldef (mm), and a focal length in the main scanning direction of the scanning optical system is assumed to be fk (mm), the following expression is satisfied:

$$(\alpha \times Ldef)/(2 \times fk) \leq 0.014.$$

15. A multi-beams optical scanning device according to claim 14, wherein, when an angle defined in the main scanning direction between an optical axis of an incident optical system, which is provided between the light source means and the deflection means, and an optical axis of the scanning optical system is assumed to be Q (rad) and a maximum field angle defined between the principal ray of light beam deflected by the deflection facet and an optical axis of the scanning optical system is assumed to be θmax (rad), the following expression is satisfied:

$$\theta max \leq Q/4.$$

16. A multi-beam optical scanning device comprising:

light source means having a plurality of light emitting points spaced apart at least in a main scanning direction;

deflection means for deflecting a plurality of light beams emitted from the light source means; and a scanning optical system for focusing the plurality of light beams deflected by the deflection means on a surface to be scanned, wherein a width in the main scanning direction of each of the plurality of light beams incident on the deflection means is wider than a width in the main scanning direction of a deflection facet of the deflection means, and wherein, when an angle defined in the main scanning direction by principal rays of the plurality of light beams emitted from the light source means when the plurality of light beams are incident on the deflection means is assumed to be $\alpha$ (rad), a distance from the deflection facet of the deflection means to a rotation center of the deflection means is assumed to be Ldef (mm), a focal length in the main scanning direction of the scanning optical system is assumed to be fk (mm), an angle defined in the main scanning direction between an optical axis of an incident optical system which directs the light beams emitted from the light source means onto the deflection facet and an optical axis of the scanning optical system is assumed to be Q (rad), and a field angle in the main scanning direction defined between the principal ray of light beam deflected by the deflection facet and the optical axis of the scanning optical system is assumed to be θ (rad), the following expression is satisfied:

$$\{(\alpha \times Ldef)/(2 \times fk)\} \times \{\cos(Q/2) - \sin(Q/2) \times \tan \theta\} \leq 0.014.$$

17. A multi-beam optical scanning device comprising:

light source means having a plurality of light emitting points spaced apart at least in a main scanning direction;

deflection means for deflecting a plurality of light beams emitted from the light source means; and a scanning optical system for focusing the plurality of light beams deflected by the deflection means on a surface to be scanned, wherein a width in the main scanning direction of each of the plurality of light beams incident on the deflection means is wider than a width in the main scanning direction of a deflection facet of the deflection means, and wherein, when an angle defined in the main scanning direction by principal rays of the plurality of light beams emitted from the light source means when the plurality of light beams are incident on the deflection means is assumed to be $\alpha$ (rad), a distance from the deflection facet of the deflection means to a rotation center of the deflection moans is assumed to be Ldef (mm), and a focal length in the main scanning direction of the scanning optical system is assumed to be fk (mm), the following expression is satisfied:

$$(\alpha \times Ldef)/(2 \times fk) \leq 0.014.$$

18. A multi-beams optical scanning device according to claim 16 or 17, wherein, when an angle defined in the main scanning direction between an optical axis of an incident optical system, which is provided between the light source means and the deflection means, and an optical axis of the scanning optical system is assumed to be Q (rad) and a maximum field angle defined between the principal ray of light beam deflected by the deflection facet and an optical axis of the scanning optical system is assumed to be θmax (rad), the following expression is satisfied:

$$\theta max \leq Q/4.$$

19. A multi-beam optical scanning device according to claim 16 or 17, wherein an optical axis of an incident optical system provided between the light source means and the deflection means in the main scanning direction is parallel with an optical axis of the scanning optical system.

20. A multi-beam optical scanning device according to claim 16 or 17, wherein, when a distance from a side most distant apart from the rotation center of the deflection means among sides of the deflection means within a main scanning section to the rotation center of the deflection means is assumed to be Lmax (mm), the following expression is satisfied:

$$Ldef < Lmax.$$

21. A multi-beam optical scanning device according to claim 16 or 17, wherein the deflection means comprises a polygon mirror.

22. A multi-beam optical scanning device according to claim 16 or 17, wherein the deflection means comprises a galvano-mirror.

23. A multi-beam optical scanning device according to claim 16 or 17, wherein a part of the plurality of light beams deflected by the deflection means are guided to the synchronous detection means via an optical system for synchronous detection which is different from the scanning optical system.

24. A multi-beam optical scanning device according to claim 16 or 17, wherein the light source means comprises a monolithic semiconductor laser.

25. A multi-beam optical scanning device according to claim 16 or 17, wherein the plurality of light beams emitted from the light source means are combined by combining means and guided to the deflection means.

26. An image forming apparatus, comprising:

a multi-beam optical scanning device as set forth in claim 16 or 17;

a photosensitive member arranged on the surface to be scanned;

a developing device for developing as a toner image an electrostatic latent image that is formed on the photosensitive member by scanning with the optical scanning device using light beams;

a transfer device for transferring the developed toner image onto a transfer medium; and a fixing device for fixing the transferred toner image on the transfer medium.

27. An image forming apparatus comprising:

a multi-beam optical scanning device as set forth in claim 16 or 17; and a printer controller for converting code data inputted from an external device into an image signal to input the image signal in the optical scanning device.

28. A color image forming apparatus comprising:

a plurality of scanning optical devices each including a multi-beam optical scanning device according to claim 16 or 17; and a plurality of image bearing members which are arranged on surfaces to be scanned of the respective optical scanning devices and form images of colors that are different from each other.

29. A color image forming apparatus according to claim 28, further comprising:

a printer controller for converting a color signal inputted from an external device into image data of different colors to input the data in the respective optical scanning devices.

* * * * *

UNITED STATES PATENT AND TRADEMARK OFFICE
CERTIFICATE OF CORRECTION

PATENT NO.     : 6,940,535 B2
DATED          : September 6, 2005
INVENTOR(S)    : Keiichiro Ishihara It is certified that error appears in the above-identified patent and that said Letters Patent is hereby corrected as shown below:

Title page,
Item [57], ABSTRACT,
Line 1, "multi-beams" should read -- multi-beam --.

Column 2,
Line 20, "sub scanning" should read -- sub-scanning --.

Column 3,
Line 42, "a" (second occurrence) should be deleted; and
Line 54, "sub scanning" should read -- sub-scanning --.

Column 4,
Line 27, "sub scanning" should read -- sub-scanning --.

Column 8,
Line 3, "is" should read -- are --;
Line 4, "minor 13" should read -- mirror 13 --; and
Line 9, "minor" should read -- mirror --.

Column 10,
Line 31, "oh" should read -- on --.

Column 13,
Line 2, "is" should read -- are --.

Column 14,
Line 47, "multi-beams" should read -- multi-beam --; and
Line 60, "numeral I" should read -- numeral 1 --.

Column 15,
Line 55, "point," should read -- points, --; and
Line 58, "its width" should read -- their widths --.

Column 17,
Line 30, " $f0 = \cos\left(\frac{Q}{2}\right) - \sin\left(\frac{Q}{2}\right) \times \tan\theta \;\ldots\; <5>$ " should read -- $f() = \cos\left(\frac{Q}{2}\right) - \sin\left(\frac{Q}{2}\right) \times \tan\theta -- \;\ldots\; <5>.$ --

UNITED STATES PATENT AND TRADEMARK OFFICE
CERTIFICATE OF CORRECTION

PATENT NO. : 6,940,535 B2
DATED : September 6, 2005
INVENTOR(S) : Keiichiro Ishihara It is certified that error appears in the above-identified patent and that said Letters Patent is hereby corrected as shown below:

Column 18,
Line 6, " "1.00" " should read -- "1.000" --; and
Line 59, "occur" should read -- occurs --.

Column 19,
Line 67, "sub scanning" should red -- sub-scanning --.

Column 22,
Line 11, "$\{(\alpha \times Ldef)/(2 \times fk)\} \times \{\cos(Q/2)-\sin(Q/2 \times \tan \theta\} \leq 0.014$." should read
-- $\{(\alpha \times Ldef)/(2 \times fk)\} \times \{\cos(Q/2)-\sin(Q/2) \times \tan \theta\} \leq 0.014$. --; and
Line 47, "are" should read -- is --.

Column 23,
Line 34, "means; and" should read -- means; --; and
Line 64, "multi-beams" should read -- multi-beam --.

Column 25,
Line 2, "moans" should read -- means --; and
Line 8, "multi-beams" should read -- multi-beam --.

Signed and Sealed this

Twenty-first Day of February, 2006

JON W. DUDAS
*Director of the United States Patent and Trademark Office*